(12) United States Patent
Hansen et al.

(10) Patent No.: US 11,770,098 B2
(45) Date of Patent: *Sep. 26, 2023

(54) COORDINATED CONTROL OF RENEWABLE ELECTRIC GENERATION RESOURCE AND CHARGE STORAGE DEVICE

(71) Applicant: 8ME NOVA, LLC, El Dorado Hills, CA (US)

(72) Inventors: Lukas Hansen, El Dorado Hills, CA (US); Philippe Garneau-Halliday, Oakland, CA (US); Gautham Ramesh, Emeryville, CA (US); Bora Akyol, El Dorado Hills, CA (US); Brandon Carpenter, Burbank, WA (US); Rahul Mondal, Sacramento, CA (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,870

(22) Filed: Mar. 6, 2023

(65) Prior Publication Data
US 2023/0208353 A1    Jun. 29, 2023

Related U.S. Application Data

(63) Continuation of application No. 16/579,282, filed on Sep. 23, 2019, now Pat. No. 11,641,177.

(Continued)

(51) Int. Cl.
*H02S 50/00* (2014.01)
*H02J 3/00* (2006.01)
(Continued)

(52) U.S. Cl.
CPC .......... *H02S 50/00* (2013.01); *H01M 10/425* (2013.01); *H02J 3/004* (2020.01); *H02J 3/32* (2013.01);
(Continued)

(58) Field of Classification Search
CPC ....................................................... H02J 3/004
(Continued)

(56) References Cited

U.S. PATENT DOCUMENTS 8,492,926 B2   7/2013  Collins et al.
8,493,030 B2   7/2013  Paice et al.
(Continued)

FOREIGN PATENT DOCUMENTS

CN         104767441 B        2/2018
EP         3 921 914 A1      12/2021
(Continued)

*Primary Examiner* — Edward Tso
*Assistant Examiner* — Ahmed H Omar
(74) *Attorney, Agent, or Firm* — Foley & Lardner LLP

(57) ABSTRACT

A method includes obtaining a state of charge (SOC) schedule for an energy storage device and a time-dependent forecast of electrical energy production by a renewable electrical energy generation resource; generating a time-varying charge/discharge control signal for the electrical energy storage device based on the time-dependent forecast of electrical energy production, wherein the time-varying charge/discharge control signal is configured to maintain an average SOC of the energy storage device as low as possible while satisfying the SOC schedule; and controlling charging and discharging of the energy storage device with the time-varying charge/discharge control signal.

20 Claims, 15 Drawing Sheets

Related U.S. Application Data

(60) Provisional application No. 62/802,928, filed on Feb. 8, 2019.

(51) Int. Cl.
| | | |
|---|---|---|
| *H02S 40/38* | (2014.01) | |
| *H01M 10/42* | (2006.01) | |
| *H02S 10/12* | (2014.01) | |
| *H02J 7/00* | (2006.01) | |
| *H02J 3/32* | (2006.01) | |
| *H02J 3/38* | (2006.01) | |

(52) U.S. Cl.
CPC ............ *H02J 3/381* (2013.01); *H02J 7/0071* (2020.01); *H02S 10/12* (2014.12); *H02S 40/38* (2014.12); *H01M 2010/4271* (2013.01); *H02J 2300/20* (2020.01); *H02J 2300/24* (2020.01); *H02J 2300/28* (2020.01)

(58) Field of Classification Search
USPC .......................................................... 320/101
See application file for complete search history.

(56) References Cited

U.S. PATENT DOCUMENTS

| | | |
|---|---|---|
| 10,135,257 B1 | 11/2018 | Adolf et al. |
| 10,944,282 B2 | 3/2021 | Malhotra et al. |
| 11,050,259 B2* | 6/2021 | Sugeno ............... H02J 3/38 |
| 11,641,177 B2 | 5/2023 | Hansen et al. |
| 2008/0228518 A1 | 9/2008 | Braziel et al. |
| 2009/0295162 A1 | 12/2009 | Oohara et al. |
| 2010/0314942 A1 | 12/2010 | Talkin et al. |
| 2011/0001356 A1* | 1/2011 | Pollack ................. H02J 3/381 |
| | | 307/31 |
| 2011/0074338 A1 | 3/2011 | Wu |
| 2011/0115303 A1 | 5/2011 | Baarman et al. |
| 2012/0004783 A1 | 1/2012 | Lo et al. |
| 2012/0228950 A1* | 9/2012 | Sakai .................. H02J 3/381 |
| | | 307/43 |
| 2013/0166081 A1 | 6/2013 | Sanders et al. |
| 2013/0272844 A1 | 10/2013 | Lobato Pena et al. |
| 2014/0100671 A1 | 4/2014 | Losee et al. |
| 2014/0129040 A1 | 5/2014 | Emadi et al. |
| 2014/0149038 A1* | 5/2014 | Cronin .................... G01W 1/10 |
| | | 702/3 |
| 2014/0210406 A1 | 7/2014 | Na et al. |
| 2014/0214219 A1 | 7/2014 | Katayama et al. |
| 2014/0257585 A1 | 9/2014 | Kubota et al. |
| 2014/0312833 A1 | 10/2014 | Won et al. |
| 2015/0091386 A1 | 4/2015 | Nagamine et al. |
| 2015/0095115 A1 | 4/2015 | Hyde et al. |
| 2015/0095116 A1 | 4/2015 | Hyde et al. |
| 2015/0278968 A1 | 10/2015 | Steven et al. |
| 2016/0006245 A1 | 1/2016 | Chow |
| 2016/0006289 A1 | 1/2016 | Sever et al. |
| 2016/0323736 A1 | 11/2016 | Donahue et al. |
| 2016/0344204 A1 | 11/2016 | Steffes et al. |
| 2016/0380466 A1 | 12/2016 | Yang et al. |
| 2017/0005515 A1 | 1/2017 | Sanders et al. |
| 2017/0085114 A1 | 3/2017 | Gao et al. |
| 2017/0102675 A1 | 4/2017 | Drees |
| 2017/0141582 A1 | 5/2017 | Adolf et al. |
| 2017/0141583 A1 | 5/2017 | Adolf et al. |
| 2017/0146608 A1 | 5/2017 | Lee et al. |
| 2017/0170684 A1 | 6/2017 | Matthey |
| 2017/0179768 A1 | 6/2017 | Jurok |
| 2017/0222438 A1 | 8/2017 | Magne et al. |
| 2017/0308968 A1 | 10/2017 | Zhou et al. |
| 2017/0331325 A1 | 11/2017 | Ristau |
| 2017/0358929 A1 | 12/2017 | Koeppe et al. |
| 2018/0012337 A1 | 1/2018 | Puetter |
| 2018/0046160 A1 | 2/2018 | Chen et al. |
| 2018/0115024 A1 | 4/2018 | Sugeno et al. |
| 2018/0159184 A1* | 6/2018 | Nishida ................ G05B 13/026 |
| 2018/0276768 A1 | 9/2018 | Mori et al. |
| 2019/0011970 A1 | 1/2019 | Youn et al. |
| 2019/0020196 A1 | 1/2019 | Poon |
| 2019/0039467 A1 | 2/2019 | Hortop et al. |
| 2019/0280532 A1 | 9/2019 | Matsuo et al. |
| 2020/0014210 A1* | 1/2020 | Arnold .................... G05B 6/02 |
| 2020/0211128 A1* | 7/2020 | Henri .................... H02J 7/0071 |
| 2021/0281077 A1 | 9/2021 | Cai et al. |

FOREIGN PATENT DOCUMENTS

| | | |
|---|---|---|
| WO | WO-2013/102894 A1 | 7/2013 |
| WO | WO-2018/156700 A1 | 8/2018 |
| WO | WO-2020/163749 A1 | 8/2020 |

\* cited by examiner

| PRIORITY | 0 | 1 | 2 | Basepoint |
|---|---|---|---|---|
| MODE | Staging | CCD | APS | Net output |
| 50 MW | | | | |
| 40 MW | Max | Max | | |
| 30 MW | | | | |
| 20 MW | | | | |
| 10 MW | | | | |
| 0 MW | | | Max | |
| -10 MW | | | Ideal | |
| -20 MW | | Ideal | Min | Ideal (-20MW) |
| -30 MW | Min | Min | | |
| -40 MW | | | | |
| -50 MW | | | | |

| PRIORITY | 0 | 1 | 2 | Basepoint |
|---|---|---|---|---|
| MODE | Staging | CCD | APS | Net output |
| 50 MW | | | | |
| 40 MW | Max | | Max | |
| 30 MW | | | Ideal | |
| 20 MW | | Max | | |
| 10 MW | | | | |
| 0 MW | | Ideal | | Ideal (0MW) |
| -10 MW | | | | |
| -20 MW | | Min | | |
| -30 MW | Min | | Min | |
| -40 MW | | | | |
| -50 MW | | | | |

*FIG. 7B*

| PRIORITY | 0 | 1 | 2 | Basepoint |
|---|---|---|---|---|
| MODE | Staging | CCD | APS | Net output |
| 50 MW | | | | |
| 40 MW | Max | | Max | |
| 30 MW | | Max | Ideal | |
| 20 MW | | | | |
| 10 MW | | | Min | Ideal (10MW) |
| 0 MW | | Ideal | | |
| -10 MW | | | | |
| -20 MW | | Min | | |
| -30 MW | Min | | | |
| -40 MW | | | | |
| -50 MW | | | | |

*FIG. 7C*

| PRIORITY | 0 | 1 | 2 | Basepoint |
|---|---|---|---|---|
| MODE | Staging | CCD | APS | Net output |
| 50 MW | | | | |
| 40 MW | Max | Max | | |
| 30 MW | | | | |
| 20 MW | | Ideal | | |
| 10 MW | | Min | Max | Ideal (10MW) |
| 0 MW | | | Ideal | |
| -10 MW | | | Min | |
| -20 MW | | | | |
| -30 MW | Min | | | |
| -40 MW | | | | |
| -50 MW | | | | |

*FIG. 7D*

| PRIORITY | 0 | 1 | 2 | Basepoint |
|---|---|---|---|---|
| MODE | Staging | CCD | APS | Net output |
| 50 MW | | | | |
| 40 MW | Max | | | |
| 30 MW | | Max | | |
| 20 MW | | | | |
| 10 MW | | Ideal | | |
| 0 MW | | Min | | Ideal (0MW) |
| -10 MW | | | Max | |
| -20 MW | | | Ideal | |
| -30 MW | Min | | Min | |
| -40 MW | | | | |
| -50 MW | | | | |

*FIG. 7E*

COORDINATED CONTROL OF RENEWABLE ELECTRIC GENERATION RESOURCE AND CHARGE STORAGE DEVICE

CROSS-REFERENCE TO RELATED APPLICATION(S)

This application claims the benefit of priority as a continuation to U.S. patent application Ser. No. 16/579,282, filed Sep. 23, 2019, which claims the benefit of priority to U.S. Provisional Patent Application No. 62/802,928 filed on Feb. 8, 2019, each of which is incorporated by reference herein.

TECHNICAL FIELD

Subject matter herein relates to methods for controlling renewable electrical energy generation resources and associated electrical energy charge storage devices in a coordinated fashion, such as for supplying an aggregated power output to an electrical grid.

BACKGROUND

A substantial increase of renewable electric generation resources, such as solar photovoltaic (PV) and wind power generators, has taken place in recent years. The unsteady nature of solar and wind generation due to natural and meteorological conditions can result in network frequency and voltage deviations. As renewable electric generation resources start to provide a greater percentage of electrical supply and displace traditional base-load electrical generation units such as coal-fired and nuclear-powered units, technical challenges are introduced, such as grid interconnection, power quality, reliability, stability, protection, and generation dispatch and control. The intermittent nature of solar and wind generation and rapid fluctuation in their output make energy storage devices (such as a battery energy storage system or BESS) attractive to enhance compatibility with electrical grids.

Co-locating renewable electric generation and electrical energy storage devices may provide cost savings by reducing costs related to site preparation, land acquisition, permitting, interconnection, installation labor, hardware, and overhead. Additionally, tax savings may result, typically if the electrical energy storage devices are subject to being charged exclusively from on-site renewable electric generation resources.

Various considerations may affect utilization of a BESS. Lithium-based batteries can degrade at an accelerated rate when at or near a full charge capacity. Grid operators seeking to dispatch an integrated renewable electric generation and charge storage facility may require attainment of specific battery state of charge (SOC) conditions at particular times in a given day (with SOC being generally defined as the percentage of the full capacity of a battery that is still available for further discharge). Once a battery is at 100% SOC, it is also unable to absorb rapid increases in electric power output of an associated renewable electric generation resource, such that any excess power generation not able to be accepted by an electrical grid may undesirably need to be dissipated as heat by clipping in a power inverter.

In view of the foregoing, need exists for improved methods for controlling renewable electrical energy generation resources and associated electrical energy charge storage devices.

SUMMARY

The present disclosure relates in various aspects to a method for coordinated control of a renewable electrical energy generation resource and an electrical energy storage device, with the method utilizing a time-dependent forecast of electrical energy production by the renewable electrical energy generation resource and state of charge (SOC) schedule for the electrical energy storage, wherein both of the electrical energy production forecast and the SOC schedule may be subject to change.

In one aspect, the disclosure relates to a method for controlling (i) a renewable electrical energy generation resource and (ii) an electrical energy storage device chargeable with electric power produced by the renewable electrical energy generation resource. The method comprises utilizing (A) a time-dependent forecast of electrical energy production by the renewable electrical energy generation resource and (B) a state of charge (SOC) schedule for the electrical energy storage device including at least one SOC target value, to generate a time-varying charge/discharge control signal for the electrical energy storage device, wherein the time-varying charge/discharge control signal is configured to ensure that the SOC schedule is satisfied by charging at the average rate necessary to meet the SOC target value, while periodically updating the generation of the time-varying charge/discharge control signal based upon at least one of an updated time-dependent forecast of electrical energy production or an updated SOC schedule.

In certain embodiments, the electrical energy storage device is charged exclusively from the renewable electrical energy generation resource.

In certain embodiments, the method further comprises altering the time-varying charge/discharge control signal responsive to a difference between forecasted production and the actual production of at least one electric generation facility to ensure that the SOC schedule is satisfied.

In certain embodiments, the time-varying charge/discharge control signal is permitted to change only once within a configurable refresh period, to keep aggregated power output of a RES-ESS facility during the refresh period, thereby enabling participation in energy markets and/or energy balance markets.

In certain embodiments, the method further comprises periodically updating the generation of the time-varying control signal upon expiration of a refresh period, wherein the periodic updating comprises computing and using a new basepoint value for aggregated energy supplied from the renewable electrical energy generation resource and the electrical energy storage device to an electrical grid upon expiration of the refresh period. In certain embodiments, the refresh period is configurable, and the time-varying charge/ discharge control signal is permitted to change no more than once per refresh period.

In certain embodiments, the time-varying charge/discharge control signal is further configured to increase the value of the time-varying charge/discharge control signal during periods of increased relative production of the renewable electrical energy generation resource to smooth an aggregated power output supplied to the electrical grid by the renewable electrical energy generation resource and the electrical energy storage device, while ensuring that the SOC schedule is satisfied.

In certain embodiments, the time-varying charge/discharge control signal is susceptible to being varied by adoption of one or more control modes of a plurality of control modes, and wherein the method further comprises:

for each control mode of the plurality of control modes, generating a plurality of control signal candidate values including an upper bound value, a lower bound value, and an ideal value; and identifying an intersection of control signal candidate values among multiple control modes, or selecting an ideal value for a control mode of highest priority, to generate the time-varying charge/discharge control signal.

In certain embodiments, the plurality of control modes comprises two or more of the following modes: Charge-Discharge mode, Coordinate Charge Discharge mode, Active Power Limit mode, Active Power Response mode, Active Power Smoothing mode, and Pricing Signal mode.

In certain embodiments, the plurality of control modes further comprises at least one of the following modes: Volt-Watt mode, Frequency-Watt Curve mode, and Automatic Generation Control mode.

In certain embodiments, the renewable electrical energy generation resource comprises a photovoltaic array, the electrical energy storage device comprises a battery array, and the time-dependent forecast of electrical energy production comprises a solar production forecast.

In certain embodiments, the renewable electrical energy generation resource comprises at least one wind turbine, the electrical energy storage device comprises a battery array, and the time-dependent forecast of electrical energy production comprises a wind production forecast.

In certain embodiments, the time-dependent forecast of electrical energy production comprises an ensemble based on of two or more of the following: on-site sky imaging, satellite imaging, and meteorological modeling.

In certain embodiments, wherein the time-dependent forecast of electrical energy production comprises a refresh rate that determines how often a new basepoint value for aggregated photovoltaic plus storage energy supplied to an electric grid (PV+S output basepoint value) is computed. In certain embodiments, a pre-existing PV+S Output value is used until a new PV+S output basepoint value is computed.

In another aspects, the disclosure relates to a non-transitory computer readable medium containing program instructions for controlling, by at least one processor, (i) a renewable electrical energy generation resource and (ii) an electrical energy storage device chargeable with electric power produced by the renewable electrical energy generation resource, the method comprising utilizing, by the at least one processor, (A) a time-dependent forecast of electrical energy production by the renewable electrical energy generation resource and (B) a state of charge (SOC) schedule for the electrical energy storage device including at least one SOC target value, to generate a time-varying charge/discharge control signal for the electrical energy storage device, wherein the time-varying charge/discharge control signal is configured to ensure that the SOC schedule is satisfied by charging at the average rate necessary to meet the SOC target schedule, while periodically updating the generation of the time-varying charge/discharge control signal based upon at least one of an updated time-dependent forecast of electrical energy production or an updated SOC schedule. In certain embodiments, the program instructions contained in the computer readable medium may be configured to perform additional method steps as disclosed herein.

In another aspect, any of the foregoing aspects, and/or various separate aspects and features as described herein, may be combined for additional advantage. Any of the various features and elements as disclosed herein may be combined with one or more other disclosed features and elements unless indicated to the contrary herein.

Other aspects, features and embodiments of the present disclosure will be more fully apparent from the ensuing disclosure and appended claims.

BRIEF DESCRIPTION OF DRAWINGS

The accompanying drawings incorporated in and forming a part of this specification illustrate several aspects of the disclosure, and together with the description serve to explain the principles of the disclosure.

FIG. 6 is a first diagram illustrating a serial (or stacking) arrangement of different control modes, with each control mode including multiple control signal candidate values, and with the serially connected control modes configured to produce a basepoint signal usable as a single active power command.

FIGS. 7A-7E embody tables identifying control signal candidate values for multiple serially connected control modes and a net output value according to different examples.

DETAILED DESCRIPTION

Figure 1A:
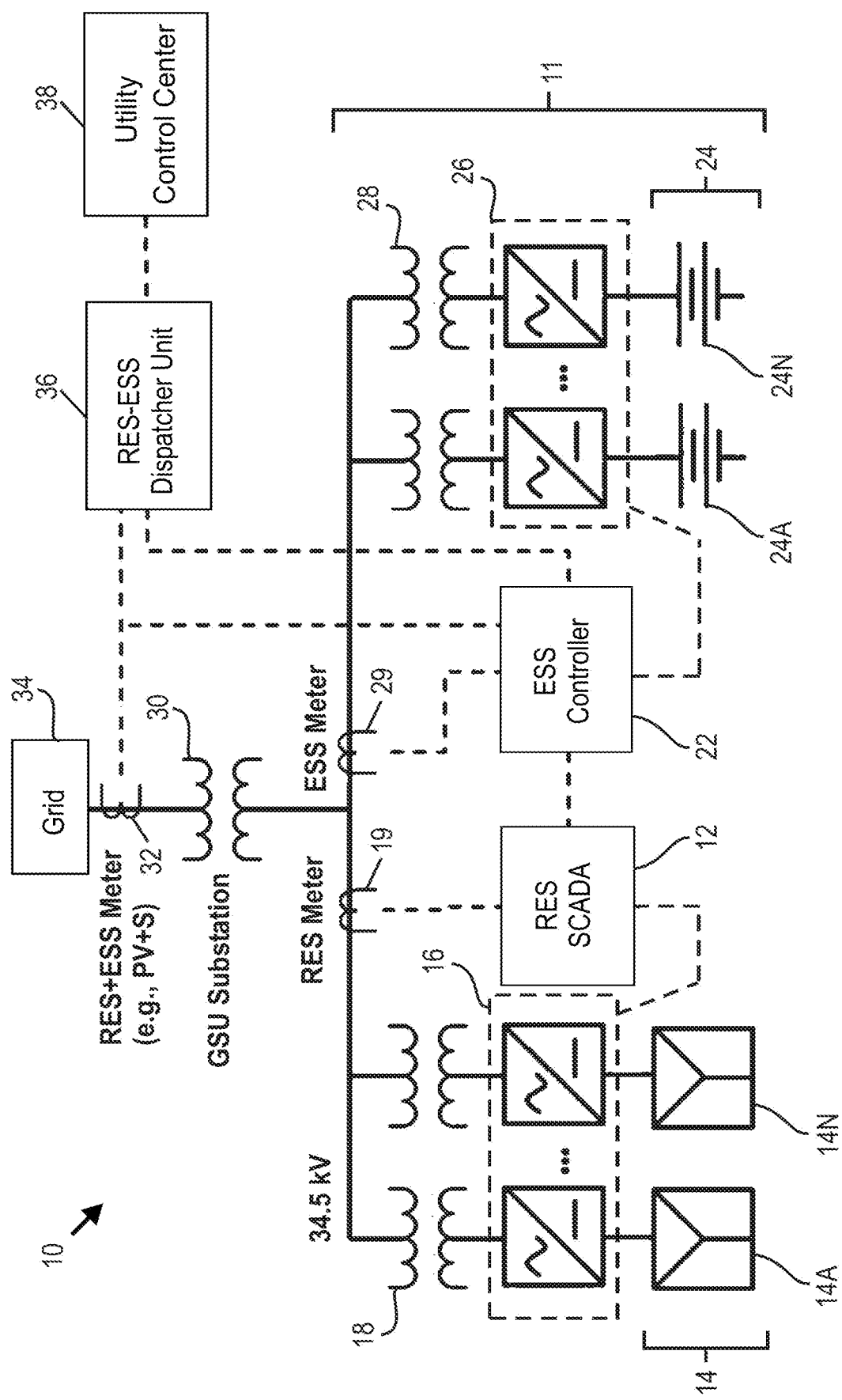
FIG. 1A is a schematic diagram showing interconnections between various components of an AC coupled metering and control system for controlling a renewable energy source and energy storage system (e.g., a photovoltaic (PV) array and a battery array chargeable with electric power produced by the PV array) according to one embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein, but it should be understood that such concepts and applications are intended to fall within the scope of the disclosure and the accompanying claims.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The Modular Energy Storage Association (MESA) recently released a specification titled "DNP3 Application Note AN2018-001—DNP3 Profile for Communications with Distributed Energy Resources," wherein "DNP" refers to Distributed Network Protocol. This MESA specification defines control modes for standalone energy storage systems. One of these control modes is called "Coordinated Charge/Discharge (CCD)." In CCD mode, an Energy Storage System (ESS) is given a schedule by which to reach a certain state of charge (SOC) by charging or discharging. For example, an ESS may be instructed to reach 100% SOC by 5 PM, and then reach 10% SOC by 10 PM. This schedule may be repeated every day. An ESS may be co-located and controlled in tandem with a photovoltaic (PV) electricity generator or any other renewable energy source.

Embodiments described in the present application document provide a highly desirable implementation of CCD mode for an integrated renewable energy source ("RES") (e.g., PV, wind, etc.) and energy storage system ("ESS") facility or plant, wherein the combination may be referred to here as RES-ESS or a RES-ESS facility (of which a photovoltaic plus storage or "PV+S" facility is a subset). A RES-ESS facility will reach the desired SOC when charging. In certain embodiments, a RES-ESS facility will reach the desired SOC by prioritizing charging at times when RES generation is high. For example, an ESS may be charged more when more RES generation is available, and an ESS may be charged less (or not at all) when RES generation is limited. In certain embodiments, a RES-ESS facility will charge the ESS only from the RES, so that a maximum investment tax credit (ITC) can be utilized to reduce the effective cost of the facility. In certain embodiments, the ESS may additionally be charged from an electric grid connected to the RES-ESS facility.

Methods disclosed herein may be enabled by integrating accurate renewable energy production forecasts (e.g., for PV or wind production) into the implementation of CCD mode. In certain embodiments, a periodic maximum SOC value specified in a SOC schedule (e.g., the maximum SOC for a particular day, wherein such value may be less than 100%) is attained as late as possible to enable maximal recovery of excess energy that would otherwise be clipped by a DC/AC inverter. In certain embodiments, a periodic maximum SOC value specified in a SOC schedule may be attained as late as possible by charging the ESS at the lowest average charging rate that will satisfy the SOC schedule; in certain embodiments, this may involve maintaining the minimum possible average SOC that still enables satisfaction of the SOC schedule. By charging an ESS as late as possible, headroom remains in the ESS to implement ancillary services that further increase the revenue generated by the RES-ESS plant.

One benefit of maintaining average SOC of an ESS as low as possible is that it may prolong the life of batteries associated with the ESS, since it is widely recognized that various types of lithium polymer batteries exhibit increased degradation with maintenance of a high average SOC.

Utilization of methods disclosed herein may also beneficially smooth the output of a RES-ESS plant, thereby providing a very desirable attribute for utilities and grid operators. A naïve implementation of CCD mode (i.e., without benefit of reading the present disclosure) would involve greedy charging, to charge as soon as possible to reach the SOC target, but such a strategy may increase the likelihood of potentially wasting clipped energy for a DC coupled storage system (thereby increasing the effective cost of operating the plant), or result in a non-smooth plant output for an AC coupled RES-ESS. Moreover, as mentioned previously, maintaining a high SOC for a long period of time would be expected to increase degradation of an ESS over its lifetime. A slightly more efficient implementation of CCD mode may interpolate the charging such that the RES-ESS facility charges the ESS linearly between the current time and the SOC target time. This proposed strategy suffers from the drawback that a desired SOC may be not satisfied if the RES-ESS facility is unable to produce energy according to the day's renewable energy production forecast.

In certain embodiments, a time-dependent forecast of electrical energy production may be based on on-site sky imaging (e.g., using a camera), satellite imaging, or meteorological modeling. In certain embodiments, a time-dependent forecast of electrical energy production may be based on an ensemble of two or more (or all three) of on-site sky imaging (e.g., using a camera), satellite imaging, and meteorological modeling.

FIG. 1A is a schematic diagram showing interconnections between various components of an AC coupled metering and control system 10 for controlling a renewable electrical energy generation device 14 including multiple generation units 14A-14N (such as a photovoltaic (PV) array including photovoltaic units) and an energy storage device 24 including multiple energy storage units 24A-24N (such as a battery array including battery units) chargeable with electric power produced by the renewable electrical energy generation device 14 in a RES-ESS facility 11 according to one embodiment. The RES-ESS facility 11 may combine a renewable electrical energy generation device 14 (e.g., such as an array of PV panels, wind turbines, or the like), and an energy storage device 24 (e.g., an array of lithium-based batteries) that may be coupled to a single substation 30 and/or located in a single property, area, or structure.

FIG. 1A illustrates an AC-coupled RES-ESS facility 11 that uses inverters 16, 26 to convert DC power produced by a renewable electrical energy generation device 14 (e.g., a PV array in certain embodiments) or power released by the energy storage device 24 to AC power for coupling to an AC electrical grid 34), but in certain embodiments, the RES-ESS facility 11 may embody a DC coupled RES-ESS facility. In certain embodiments, an energy storage device 24 may include at least one of (or a combination of) batteries 24A, 24B using various constructions and chemistries, capacitors, or mechanical energy storage devices such as flywheels or pumped-hydro installations. In certain embodiments, an energy storage device 24 may include at least one hydrolysis unit (e.g., configured to electrolyze water to release hydrogen) and a hydrogen storage unit (e.g., adsorbent media for releasably binding hydrogen, storage vessels, and/or reversible chemical reactant vessels or beds). In certain embodiments, an energy storage device 24 may consist of electrical charge storage devices such as batteries, optionally augmented with capacitors.

In certain embodiments, a RES-ESS dispatcher unit 36 has the ability to control the charge or discharge of the energy storage device 24 (e.g., batteries) by communicating with an ESS controller 22, which may be located in the RES-ESS facility 11. A RES SCADA (supervisory control and data acquisition) controller 12 is operatively coupled with RES inverters 16 associated with the renewable electrical energy generation device 14 (optionally embodied in a PV array), and the ESS controller 22 is operatively coupled with ESS inverters 26 associated with the energy storage device 24, with both the RES SCADA controller 12 and the ESS controller 22 being in communication with the RES-ESS dispatcher unit 36. In certain embodiments, a utility control center 38 (e.g., of an electric power utility or grid operator) may communicate with the RES-ESS dispatcher unit 36 using DNP3 and set different configuration options. Additionally, the RES-ESS dispatcher unit 36 receives (or generates) an accurate renewable generation forecast (e.g., solar generation forecast) that it uses to implement the CCD and other control modes. As shown in FIG. 1A, certain embodiments may utilize readily available electric power meters, such as a RES+ESS electrical power meter 32 to measure RES-ESS (e.g., PV+S) facility output, a RES electrical power meter 19 to measure RES output, and an ESS electrical power meter 29 to measure ESS output. Signals from the RES electrical power meter 19 are provided to the RES SCADA controller 12, and signals from the ESS electrical power meter 29 are provided to the ESS controller 22. The electric power generated by the RES-ESS facility 11 may be provided to an electric power system (e.g., an AC electrical grid 34) via a generator step-up (GSU) substation 30 that implements protection and appropriate voltage conversion. RES transformers 18 and ESS transformers 28 may be arranged between the inverters 16, 26, respectively, and the GSU substation 30 to provide voltage conversion utility (e.g., to supply AC power signals to the GSU substation 30 at 34.5 kV in certain implementations).

Figure 1B:
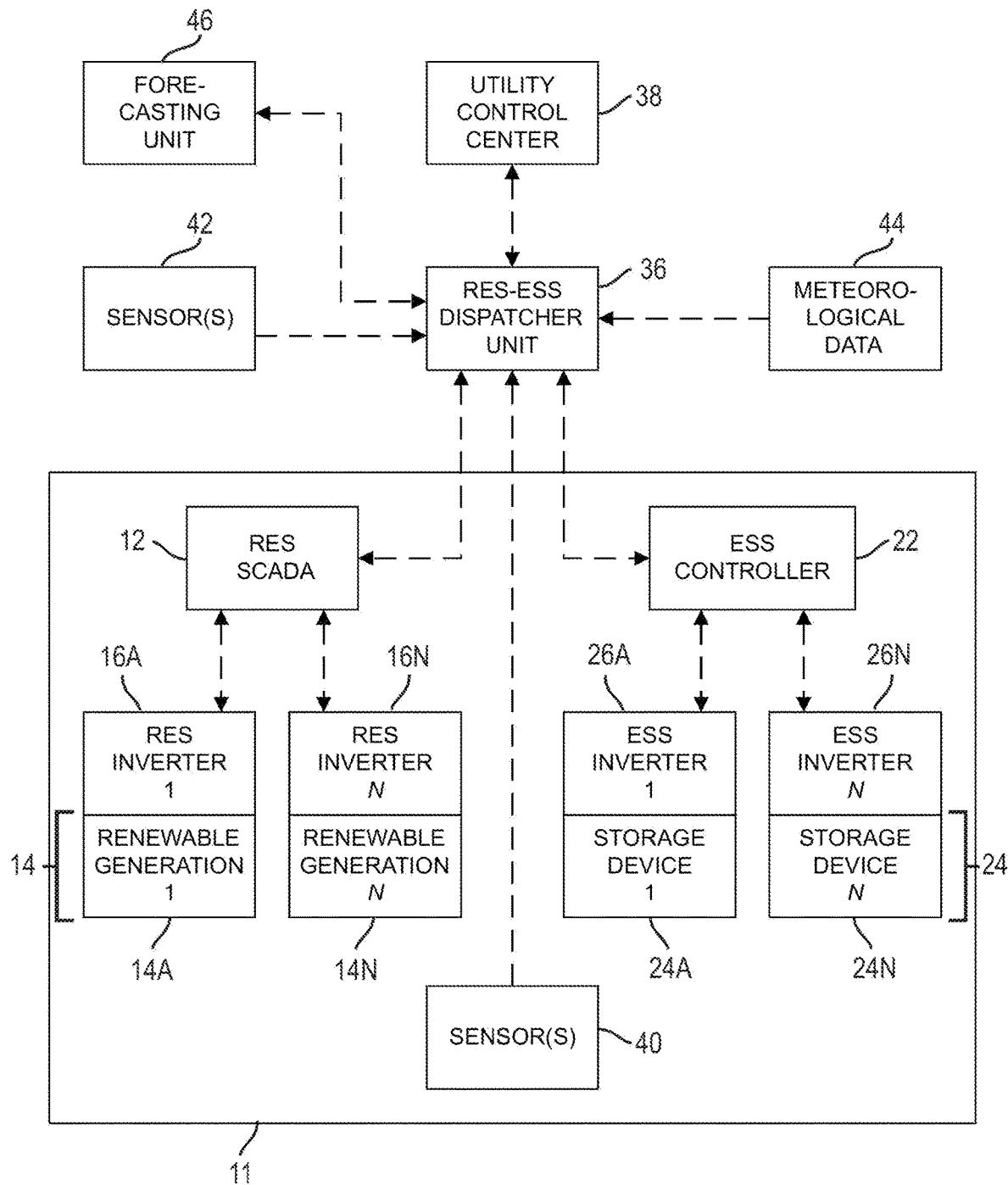
FIG. 1B is a schematic diagram showing certain components of the AC coupled metering and control system of FIG. 1A.

FIG. 1B is a schematic diagram showing certain components of the AC coupled metering and control system of FIG. 1A, including interconnection of control- and sensor-related components. As shown in FIG. 1B, the RES-ESS dispatcher unit 36 is arranged between a utility control center 38 and a RES-ESS facility 11. Within the RES-ESS facility 11, a RES SCADA controller 12 is operatively coupled with RES inverters 16A-16N (wherein N represents any suitable number) that are configured to provide AC conversion of DC power produced by renewable electrical energy generation units 14A-14N (e.g., arrangeable as parts of a renewable electrical energy generation device 14). Similarly, within the RES-ESS facility 11, an ESS controller 22 is operatively coupled with ESS inverters 26A-26N that are configured to provide AC conversion of DC power supplied by energy storage units 24A-24N (e.g., arrangeable as parts of an energy storage device 24). The RES-ESS facility 11 further includes at least one sensor 40, which may comprise one or more sky imaging sensors useful to determine sky conditions (such as presence of clouds) proximate to the RES-ESS facility 11, with output signals from the at least one sensor 40 being supplied to the RES-ESS dispatcher unit 36. The RES-ESS dispatcher unit 36 may also receive: (i) signals from one or more sensors 42 (e.g., satellite imaging sensors or the like) not necessarily associated with the RES-ESS facility 11; (ii) meteorological data provided by a meteorological modeling unit 44; (iii) signals from a forecasting unit 46 that may forecast generation by the renewable electrical energy generation device 14 and/or one or more other renewable electrical energy generation devices or units. In certain embodiments, time-dependent forecasting of electrical energy production may be performed by the forecasting unit 46 or may be performed by the RES-ESS dispatcher unit 36. In certain embodiments, a time-dependent forecast of electrical energy production may utilize one, two, or all three of the following: on-site sky imaging provided by the sensor(s) 40, satellite imaging provided by the sensor(s) 42, and meteorological data provided by the meteorological modeling unit 44. In certain embodiments, sensors of other types may be used.

Figure 2:
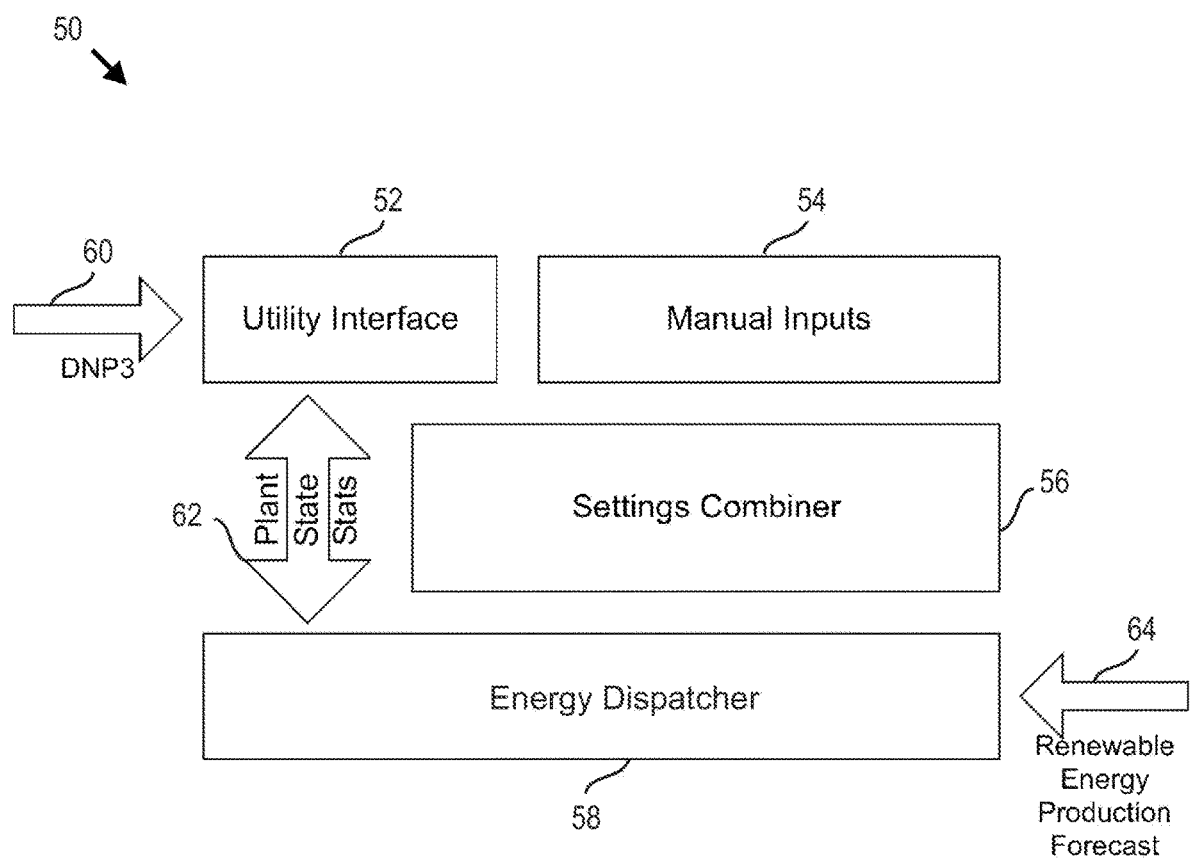
FIG. 2 is a block diagram for a processor-based energy dispatch control system for dispatching a renewable electrical energy generation resource and an electrical energy storage device chargeable with electric power produced by the renewable electrical energy generation resource according to one embodiment.

FIG. 2 is a block diagram showing for a processor-based energy dispatch control system 50 for dispatching a RES- ESS facility (e.g., including renewable electrical energy generation resource and an electrical energy storage device chargeable with electric power produced by the renewable electrical energy generation resource) according to one embodiment. The control system 50 includes as functional blocks a utility interface 52, manual inputs 54, a settings combiner 56, and an energy dispatcher 58. The utility interface 52 communicates with an electric power system utility, and with the energy dispatcher 58 to receive configuration commands (e.g., CCD mode configuration commands) and send plant status and state information 62. An example of a CCD mode configuration set by a utility may be a schedule that contains a first SOC target at a pre-determined time, and a second SOC target at a second pre-determined time. For example, the utility may want the ESS to reach an SOC of 90% by 5:00 PM and an SOC of 10% by 10:00 PM. The utility interface 52 receives DNP3 (Distributed Network Protocol) information via a DNP3 link 60, and is responsible for converting the published DNP3 configuration points to internal data structures. The utility interface 52 is also responsible for communicating any data structure changes back to the utility via the DNP3 link 60. Manual inputs 54 include configuration parameters that are not addressable by MESA-ESS SCADA points. The settings combiner 56 validates any configuration inputs and passes them to the energy dispatcher 58 in one implementation. The settings combiner 56 receives MESA-ESS schedules/modes/curves provided by a utility or grid operator, receives schedules produced by an optimizer, and receives any potential manual inputs 54, and then produces combined schedules/modes/curves. The energy dispatcher 58 is an engine that executes control modes (including but not limited to coordinated charge/discharge or CCD) for the RES-ESS facility (or plant) and decides on the charge or discharge level of the ESS utilizing a renewable energy production forecast 64. The energy dispatcher 58 is responsible for controlling output of a RES-ESS fin short time scales by observing the current state of the RES-ESS plant, utilizing time-dependent forecasts of electrical energy production by the RES, and utilizing any combined MESA-ESS schedules/modes/curves produced by the settings combiner 56. A renewable energy forecast may contain a time series of points for the power expected to be generated by the renewable energy source (e.g., PV array, wind turbine, etc.). Such a forecast may have a format of (timestamp, power value) and contain a set of time values of specified intervals (e.g., 15 minutes in 1 minute intervals, 36 hours in 1 hour intervals, etc.). These potential formats and timeframes are provided to illustrate the nature of an exemplary forecast, and are not intended to limit the disclosure. The energy dispatcher 58 is also responsible for passing alerts and RES-ESS plant state and/or status information back to the utility interface 52.

In certain embodiments, methods disclosed herein for controlling a RES-ESS plant utilizing a coordinated charge/discharge (CCD) mode may work simultaneously with other (e.g., PV+S) control algorithms according to an amalgamation process. Such an amalgamation processes uses ideal, minimum (lower bound), and maximum (upper bound) values produced by each control algorithm (wherein each algorithm corresponds to a different control mode), and based on the configured priority of a control algorithm, amalgamation produces a final ESS charge or discharge target. In this regard, in certain embodiments a time-varying charge/discharge control signal is susceptible to being varied by adoption of one or more control modes of multiple control modes, wherein for each control mode of a plurality of control modes, signal candidate values including an upper bound value, a lower bound value, and an ideal value are generated. Additionally, an intersection of control signal candidate values among multiple control modes is identified, or an ideal value for a control mode of highest priority is selected, to generate the time-varying charge/discharge control signal. Examples of control modes that may be utilized in methods disclosed herein include the following active power modes specified in the MESA-ESS specification: Charge-Discharge (CD) mode, Coordinated Charge Discharge (CCD) mode, Active Power Limit (APL) mode, Active Power Response (APR) mode, Active Power Smoothing (APS) mode, Pricing Signal (PS) mode, Volt-Watt (VW) mode, Frequency-Watt Curve (FWC) mode, and Automatic Generation Control (AGC) mode. Such modes will be described hereinafter.

Figure 3:
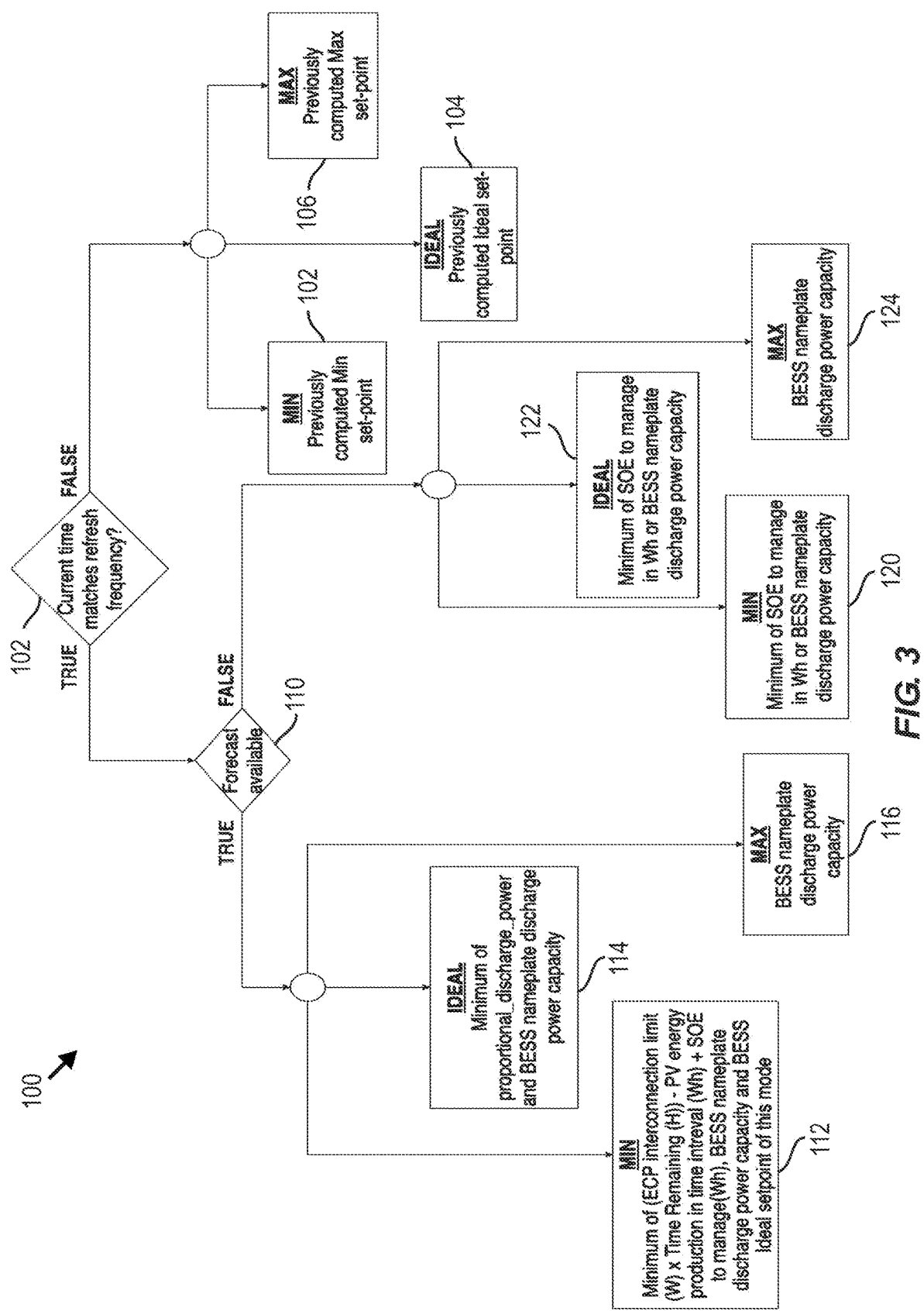
FIG. 3 is a logic diagram for charging an electrical energy storage device to reach a state of charge (SOC) target value using a system that includes a PV array and a battery array chargeable with electric power produced by the PV array according to one embodiment.
Figure 4:
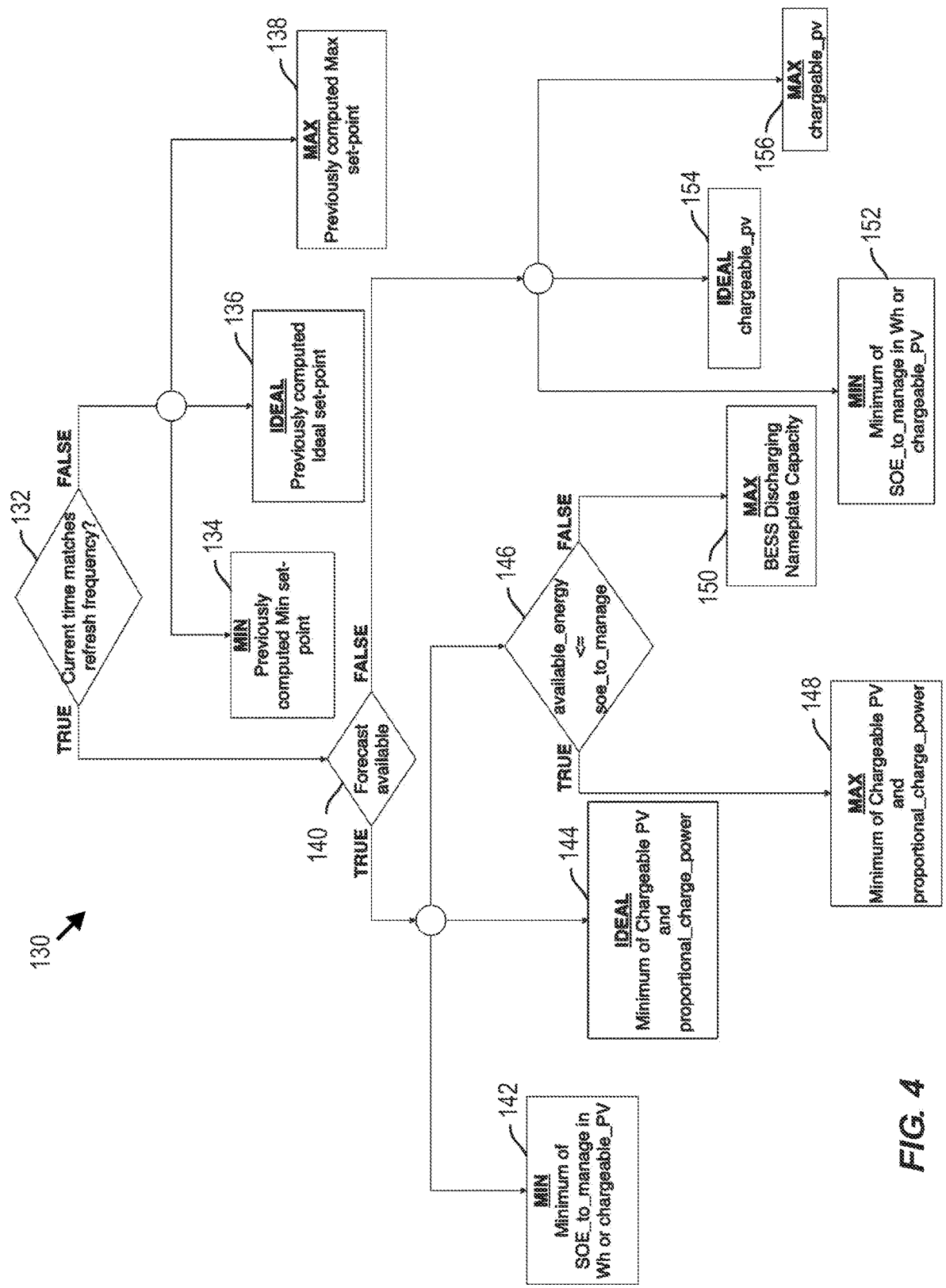
FIG. 4 is a logic diagram for discharging an electrical energy storage device using a system that includes a PV array and a battery array chargeable with electric power produced by the PV array according to one embodiment.

FIGS. 3 and 4 embody logic diagrams for charging and discharging, respectively, of an electrical energy storage device using a system that includes a PV array and a battery array chargeable with electric power produced by the PV array. Although PV is referenced herein, it is to be appreciated that the disclosed concepts extend to any one or more types of renewable electrical energy generating units (wind, solar, tidal, etc.) FIGS. 3 and 4 refer to numerous variables. Before describing FIGS. 3 and 4 in detail, variables described in such figures are described in the following Table 1.

TABLE 1

| Variable | Definition |
| --- | --- |
| refresh period | The time between two consecutive executions of the algorithm, wherein BESS_ideal, BESS_min and BESS_max values are held constant during a refresh period (until a next execution of the algorithm) |
| SOC | State of charge |
| SOE | State of energy |
| soc_to_manage | The difference between the target SOC (%) and the current SOC (%) |
| soe_to_manage | soe_to_manage (%) applied to the battery energy rating in Watt-hours |
| pv_production_forecast | An array-like object consisting of the photovoltaic power production forecast from the current timestep to the SOC target time |
| pv_production_in_period | Forecasted PV production during the refresh period |
| chargeable_pv_forecast | Lesser of the current PV production and the BESS nameplate charging capacity |
| chargeable_energy_till_target | Sum of chargeable_pv over the pv production forecast |
| avg_pv_production_forecast | Arithmetic mean of pv_production_forecast |

TABLE 1-continued

| Variable | Definition |
|---|---|
| avg_pv_production_in_period | Arithmetic mean of pv_production_in_period |
| avg_charge_power | Amount of energy required to be supplied to a battery to reach a target SOC value divided by the number of hours remaining |
| avg_discharge_power | Amount of energy required to be received from a battery to reach a target SOC value divided by the number of hours remaining |
| proportional_charge_power | Average charge power multiplied by avg_pv_production_in_period and then divided by the avg_pv_production_forecast |
| proportional_discharge_power | Average discharge power multiplied by the minimum of (i) avg pv production in period divided by the avg_pv_production_forecast and (ii) 1 (i.e., the discharge is capped at a multiplier of 1) |
| disch_energy_avail_till_target | (ECP interconnection limit (W) × Time Remaining (H)) - PV energy production in time interval (Wh) |

Charging Logic. FIG. 3 is a diagram providing charging logic 100 for charging an electrical energy storage device to reach a state of charge (SOC) target value using a system that includes a PV array and a battery array chargeable with electric power produced by the PV array, according to one embodiment. CCD mode runs from a configured start time to a configured end time and works to get the ESS to a desired SOC target by a certain time. CCD mode may be executed in a loop inside the energy dispatcher and at each refresh period calculates and returns to the controller the following three values: BESS_ideal, BESS_max, and BESS_min, as will be described hereinafter, following discussion of refresh period.

A refresh period is considered before execution of CCD mode, in order to limit the ability of RES-ESS facility output to fluctuate except during specified time intervals. From a dispatching perspective, limiting the RES-ESS output fluctuations to specified time intervals is attractive to permit an electrical system (e.g., grid) operator to coordinate different generation resources to meet a specified system load, since various generation purchase and supply transactions are commonly scheduled as firm power outputs for specific (predetermined) blocks of time. Participation by bidding in energy markets or energy balance markets requires firm commitments to supply power for specified periods of time. To address this issue, a refresh period may be used with systems and method disclosed herein, with the refresh period being selected to be a time period convenient for a system operator (e.g., 15 minutes, 30 minutes, or another selectable time interval). A refresh period corresponds to a time between two consecutive executions of a RES-ESS control algorithm (e.g., for establishment of new basepoint values). BESS_min, BESS_ideal, and BESS_max values are recalculated once upon the expiration of a refresh period, but after such values are recalculated, they remain constant until expiration of the next refresh period. This is shown in FIG. 3. Decision block 102 considers whether the current time matches the refresh frequency. If the query in decision block 102 is false (i.e., the current refresh period has not yet ended), then values for each of BESS_min, BESS_ideal, and BESS-max remain unchanged (i.e., BESS_min remains the previously computed Min set-point at block 102, BESS_ideal remains the previously computed Ideal set-point at block 104, and BESS_max remains the previously computed Max set-point at block 106). If the query in decision block 102 is true (i.e., the current refresh period has ended), then values for each of BESS_min, BESS_ideal, and BESS_max may be recalculated, starting at decision block 110.

Bess_Ideal Calculation. Decision block 110 considers whether a forecast is available. If a forecast is available (i.e., the inquiry at decision block 110 is true), then the BESS prioritizes charging at times when the PV generation is higher, and BESS_min, BESS_ideal, and BESS_max are computed at blocks 112, 114, and 116, respectively. At block 114, BESS_ideal is set to the minimum of proportional_charge_power and BESS nameplate discharge power capacity. In implementations wherein grid charging is not permitted, the highest charging level that can be obtained is equal to the power generated from PV. If a forecast is not available (i.e., the inquiry at decision block 110 is false), then in certain embodiments the BESS performs "greedy charging" by charging the entire chargeable_pv at every timestep. In certain embodiments, if a forecast is not available, the BESS_ideal set-point is the minimum of SOE to manage in Wh or BESS nameplate discharge power capacity, as indicated at block 122.

BESS_max Calculation. In certain embodiments, the BESS_max power set-point for CCD is the same as the BESS_ideal power set-point if the amount of energy available is less than the amount of energy required to reach the SOC target. In certain embodiments, the BESS_max power set-point is the nameplate discharge power capacity of the BESS, as indicated at block 116. If a forecast is not available (i.e., the inquiry at decision block 110 is false), then the BESS_max power set-point is the BESS nameplate discharge power capacity, as indicated at block 124.

BESS_min Calculation. If a forecast is available (i.e., the inquiry at decision block 110 is true), then the BESS_min power set-point for charging (most negative power set-point) is the minimum of (i) (ECP interconnection limit (in Watts) times Time Remaining (in Hours)) minus PV energy production in time interval (in Watt hours) plus SOE to manage (in Watt hours), (ii) Bess nameplate discharge power, or (iii) Bess_ideal setpoint of this mode, as indicated at block 112. If a forecast is not available (i.e., the inquiry at decision block 110 is false), then the BESS_min power set-point is the minimum of SOE to manage in Wh or BESS nameplate discharge power capacity, as indicated at block 120.

Discharging Logic. FIG. 4 is a diagram providing discharging logic 130 for discharging an electrical energy storage device using a system that includes a PV array and a battery array chargeable with electric power produced by the PV array according to one embodiment. As before, a refresh period is considered before execution of CCD mode, in order to limit the ability of RES-ESS facility output to fluctuate except during specified time intervals. As shown in FIG. 4, decision block 132 considers whether the current time matches the refresh frequency. If the query in decision block 132 is false (i.e., the current refresh period has not yet ended), then values for each of BESS_min, BESS_ideal, and BESS_max remain unchanged (i.e., BESS_min remains the previously computed Min set-point at block 134, BESS_ideal remains the previously computed Ideal set-point at block 136, and BESS_max remains the previously computed Max set-point at block 138). If the query in decision block 132 is true (i.e., the current refresh period has ended), then values for each of BESS_min, BESS_ideal, and BESS_max may be recalculated, starting at decision block 140.

With continued reference to FIG. 4, CCD mode runs from a configured start time to a configured end time and works to get the ESS to a desired SOC target by a certain time. CCD mode may be executed in a loop inside the energy dispatcher and at each refresh period calculates and returns to the controller the following three values: Bess_Ideal, Bess_Max, and Bess_Min, as will be described below.

BESS_ideal Calculation. Decision block 140 considers whether a forecast is available. If a forecast is available (i.e., the inquiry at decision block 140 is true), then the BESS prioritizes discharging at times when the PV generation is lower, and BESS_min, BESS_ideal, and BESS_max are computed at blocks 142, 144, and 146, respectively. At block 144, Bess_ideal is set to the minimum of chargeable PV and proportional_charge_power. If the discharging period is not during the day, then the BESS_ideal power setpoint would be the avg discharge_power. If a forecast is not available (i.e., the inquiry at decision block 140 is false), the Ideal BESS discharge power setpoint would be chargeable_pv, as indicated at block 154.

BESS_min Calculation. Regardless of whether a forecast is available (i.e., if the inquiry at decision block 140 is true or false), the BESS_min power setpoint would be the minimum of (i) SOE_to_Manage (in Watt-hours) or chargeable_PV, as indicated at blocks 142 and 152.

BESS_max Calculation. If a forecast is available (i.e., the inquiry at decision block 140 is true), then logic proceeds to decision block 146, which presents an inquiry whether available_energy is less than or equal to SOE_to_manage. If the inquiry at decision block 146 is true, then the BESS_max power setpoint would be the minimum of chargeable PV and proportional_charge_power, as indicated at block 148. If the inquiry at decision block 146 is false, then the BESS_max power setpoint would be the BESS discharging power nameplate capacity, as indicated at block 150. Turning back to decision block 140, if the inquiry at decision block 140 is false, then the BESS_max power setpoint would be chargeable_pv, as indicated at block 156.

Figure 5:
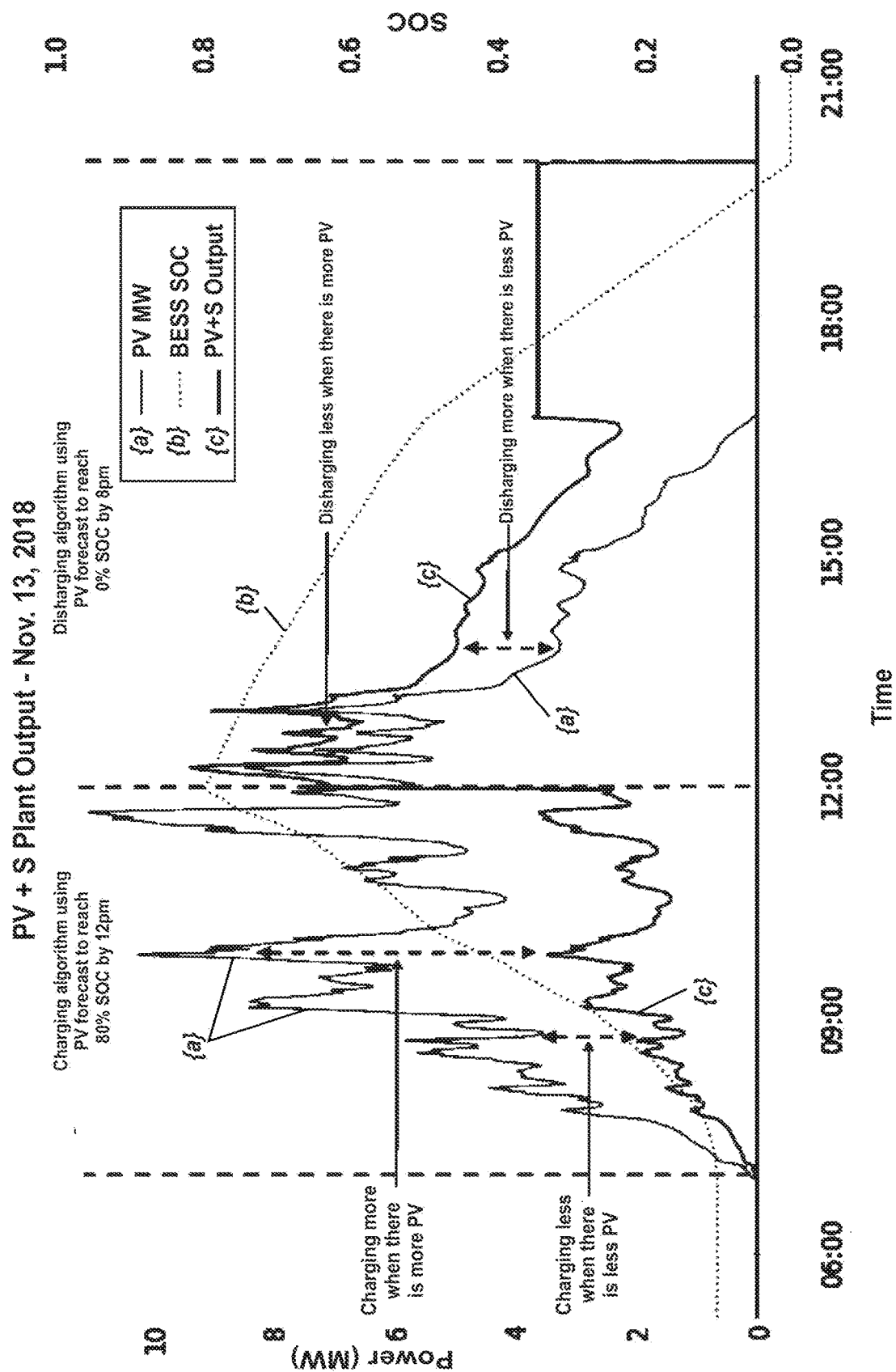
FIG. 5 is a modeled output plot for a system including a renewable electrical energy generation resource (RES) and an electrical energy storage device (ESS) chargeable with electric power produced by the renewable electrical energy generation resource, when controlled by a method as disclosed herein, for a period between 06:00 and 21:00 of a single day.

FIG. 5 is an exemplary output plot for system including a renewable electrical energy generation resource (RES) and an electrical energy storage device (e.g., a battery energy storage system or BESS) chargeable with electric power produced by the renewable electrical energy generation resource, when controlled by a method as disclosed herein, for a period between 06:00 and 21:00 of a single day. The output plot includes PV generation in megawatts (PV MW), state of charge of the battery energy storage system (BESS SOC), and aggregated photovoltaic plus storage energy supplied to an electric grid (PV+S Output). A SOC schedule requires attainment of 80% SOC for the BESS by 12:00, and 0% SOC by 20:00 (8:00 PM). A charging algorithm is employed from about 07:00 to 12:00, and a discharging algorithm is employed from 12:00 to 20:00. While the charging algorithm is employed, PV MW is not necessarily the PV+S Output, since a portion of the PV generation is allocated to charge the BESS. The SOC of the BESS rises from 07:00 to 12:00, but not at a linear rate. As shown by the dashed vertical lines with arrow ends, while the charging algorithm is in use, a greater amount of BESS charging results when more PV generation is available, and a lesser amount of BESS charging results when less PV generation is available. Conversely, while the discharging algorithm is in use, a lesser amount of energy is discharged from the BESS when more PV generation is available, and a greater amount of energy is discharged from the BESS when less PV generation is available.

As noted previously herein, the MESA-ESS specification describes the following active power modes: [1] Charge-Discharge (CD) mode, [2] Coordinated Charge-Discharge (CCD) mode, [3] Active Power Limit (APL) mode, [4] Active Power Response (APR) mode, [5] Active Power Smoothing (APS) mode, [6] Pricing Signal (PS) mode, [7] Volt-Watt (VW) mode, [8] Frequency-Watt Curve (FWC) mode, and [9] Automatic Generation Control (AGC) mode. Modes [1] to [6] result in a battery active power output that may be called a "basepoint," such that modes [1] to [6] may be termed basepoint modes. Modes [7] to [9] are "additive" modes that add positive or negative power to the basepoint, and may be termed non-basepoint modes. A unique characteristic of the non-basepoint modes is that APS mode will not consider the resultant added power from them when calculating the next basepoint.

The MESA-ESS specification delineates how different active power control modes should function and identifies the possibility of combining them, but such document does not attempt to define how the functionality of different control modes can be combined or stacked. Each active mode can usually be satisfied with a range of power responses at any given time. For example, if a 4 hour battery (e.g., that is chargeable from 0% to 100% in 4 hours) has an 8 hour window in which the battery is to be charged, the battery could charge all in the beginning, all at the end, or evenly throughout the 8 hour window. This flexibility can be leveraged to implement multiple modes at the same time, such as a charge window and smoothing solar power generation. Amalgamation processes described herein enable different MESA-ESS active power control modes to be combined to produce an output that accommodates the respective control modes if they are compatible, while also allowing each control mode to be prioritized relative to the other control mode.

As introduced previously herein, an algorithm dedicated to each active power control mode may output an ideal value, a minimum (lower bound—corresponding to the most negative or least positive) value, and a maximum (upper bound—corresponding to the most positive or least negative) value that can be accommodated by a BESS while the still being able to satisfy defined requirements (e.g., according to a SOC schedule). In certain embodiments, such values embody power setpoints that may be defined with respect to a BESS meter, whereby a negative value represents charging and a positive value represents discharging. The ideal BESS power setpoint for each mode represents the preferred active power requirement for it to operate most efficiently in order to perform its function. The three setpoints (ideal, minimum, and maximum) could mean different things for different active power control modes. For example, for Coordinated Charge Discharge Management (CCD) mode, the Min and Max BESS power setpoints would represent the minimum and maximum BESS power, respectively, that the mode can accommodate at that instant while satisfaction of a SOC target is still attained. The ideal power setpoint could be defined as the required BESS active power to reach the SOC target in an optimal fashion.

For Active Power Limiting control mode that limits the power below a certain active power limit, the BESS_max power setpoint would be the maximum power the control mode can accommodate (i.e., a power threshold), while the minimum BESS power setpoint for this case could be the minimum operating limit of the RES-ESS plant since the control mode does not have a set lower limit threshold.

Mode-stacking may be performed by connecting different control modes in series. This may be implemented by passing the Min, Max, and Ideal setpoints of one control mode to the next control mode in order of priority of the respective control mode. The control mode next in series may use the setpoint values of the previous control mode in its computation, and then output its own setpoint values.

Figures 6, 7A:
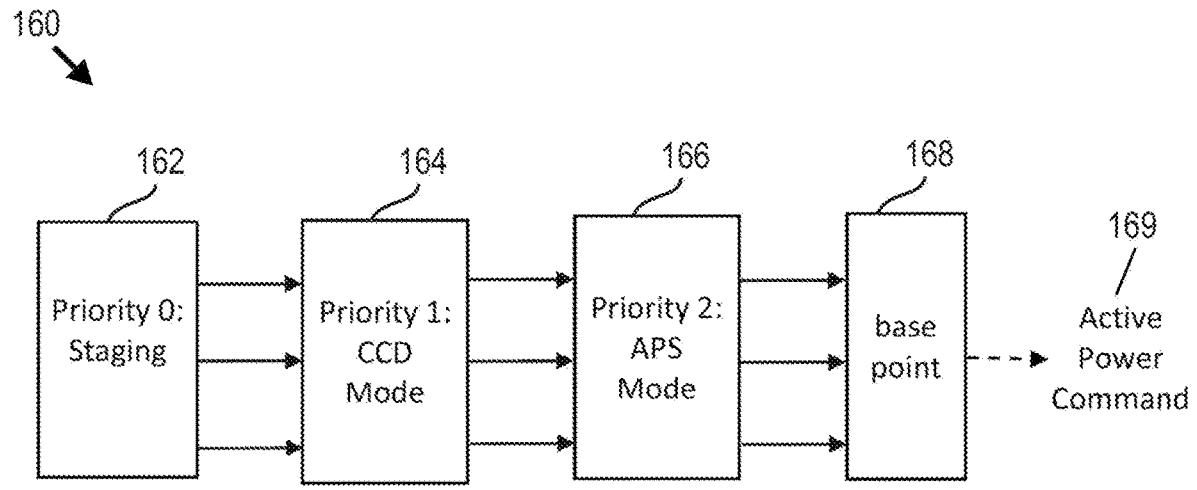

FIG. 6 is a first diagram illustrating a serial (or stacking) arrangement of different control modes 162, 164, 166 usable by a control system 160, with each control mode including multiple control signal candidate values, and with the serially connected control modes producing a single active power command. The highest priority, staging mode 162 consists of the operating limits of the BESS and is always the highest priority (e.g., Priority 0). All control modes should operate within the limit (Min and Max) defined by the staging mode 162. Stacking control modes sequentially tests whether a lower priority mode's requirement is within the limits of a higher priority mode. If the lower priority mode is out of bounds, then the setpoints of the higher priority mode get preference by overriding setpoints of the lower priority mode. As shown, the next highest priority modes are CCD mode 164 and APS mode 166, respectively. A basepoint signal 168 is generated by identifying an intersection of control signal candidate values among the multiple control modes 162, 164, 166, or selecting an ideal value for a control mode 162, 164, 166 of highest priority, and in the present embodiment the basepoint signal 168 serves as a time-varying charge/discharge control signal (e.g., an active power command signal) 169 usable for controlling one or more components of a RES-ESS facility.

As noted previously, the staging mode is by default the highest priority mode and contains the present operating limits of the ESS (e.g., BESS). The Min and Max of this mode are calculated using the current operational state and conditions of the ESS. Examples of limits addressed by staging mode include fundamental system limits (e.g., energy source or self-imposed limits), nameplate and device limits (e.g., nameplate maximum voltage rating and nameplate active generation power rating at unity power factor)), and present operating limits (e.g., maximum voltage and maximum active generation power). As an example of energy source of self-imposed limits, consider that a system cannot produce power that it does not have available, and that limits on wattage may result from availability on solar resources and/or limits an inverter imposes on itself due to factors such as thermal conditions, errors, failures, etc.

FIGS. 7A-7E embody tables identifying control signal candidate values for multiple serially connected control modes and a net output value according to five different examples. In FIG. 7A, all control modes are within the bounds set by the higher priority mode, and a value of −20 MW is selected as the basepoint net output. In FIG. 7B, all control modes are outside the bounds set by the higher priority mode, and a value of 0 MW is selected as the basepoint net output. In FIG. 7C, all control modes partially overlap, and a value of 10 MW is selected as the basepoint net output. In FIG. 7D, the higher priority CCD mode can partially accommodate the lower priority APS mode, and a value of 10 MW is selected as the basepoint net output. In FIG. 7E, the higher priority CCD mode and lower priority APS mode setpoints conflict with one another, such that the value within CCD mode range and closest to the APS mode range (namely, 0 MW) is selected as the basepoint net output.

In certain embodiments, different control modes (or combinations of control modes) may be operated at different times.

Figure 8:
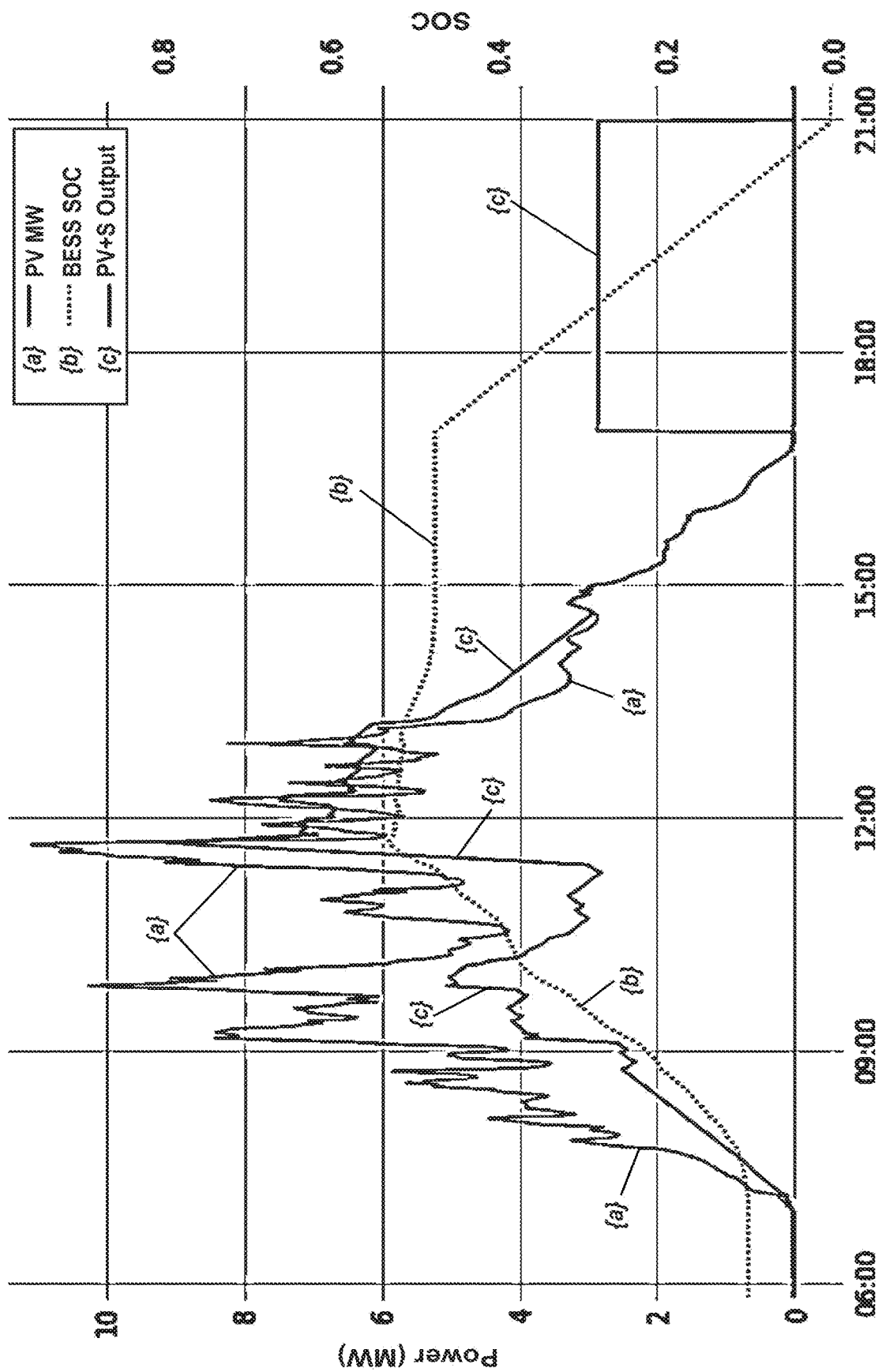
FIG. 8 is an exemplary output plot for system including a renewable electrical energy generation resource (RES) and an electrical energy storage device (ESS) chargeable with electric power produced by the renewable electrical energy generation resource, when controlled by a method utilizing different combinations of connected control modes at different times according to one embodiment.

FIG. 8 is an exemplary output plot for system including a renewable electrical energy generation resource (e.g., a PV source) and an electrical energy storage device (e.g., a BESS) chargeable with electric power produced by the renewable electrical energy generation resource, when controlled by a method utilizing different combinations of connected control modes at different times according to one embodiment. The output plot includes PV generation in megawatts (PV MW)), state of charge of the battery energy storage system (BESS SOC), and aggregated photovoltaic plus storage energy supplied to an electric grid (PV+S Output). Active Power Smoothing (APS) mode plus Coordinated Charge-Discharge (CCD) mode are enabled at sunrise (about 07:00) to reach 50% SOC by 12:00. Only APS mode is enabled from 12:00 until 14:30. Only CCD mode is enabled at sunset (about 17:00) to reach 0% SOC by 21:00. As shown in FIG. 8, combined PV+S output exhibits less peak-to-trough variation than PV MW during periods of significant PV MW fluctuation (e.g., from 08:00 through 14:00).

APS is a basepoint control mode that smooths PV+S plant output based on a specified Electrical Connection Point (ECP) reference meter signal. In certain embodiments, APS may involve measuring current PV+S output at the point of interconnect with a grid, calculating a moving average of the ECP reference meter based on an APS filter time, calculating additional watts required based on (i) a deadband (extending ahead and behind of the moving average of reference power), (ii) a smoothing gradient, and (iii) the moving average of the ECP reference meter.

Figure 9:
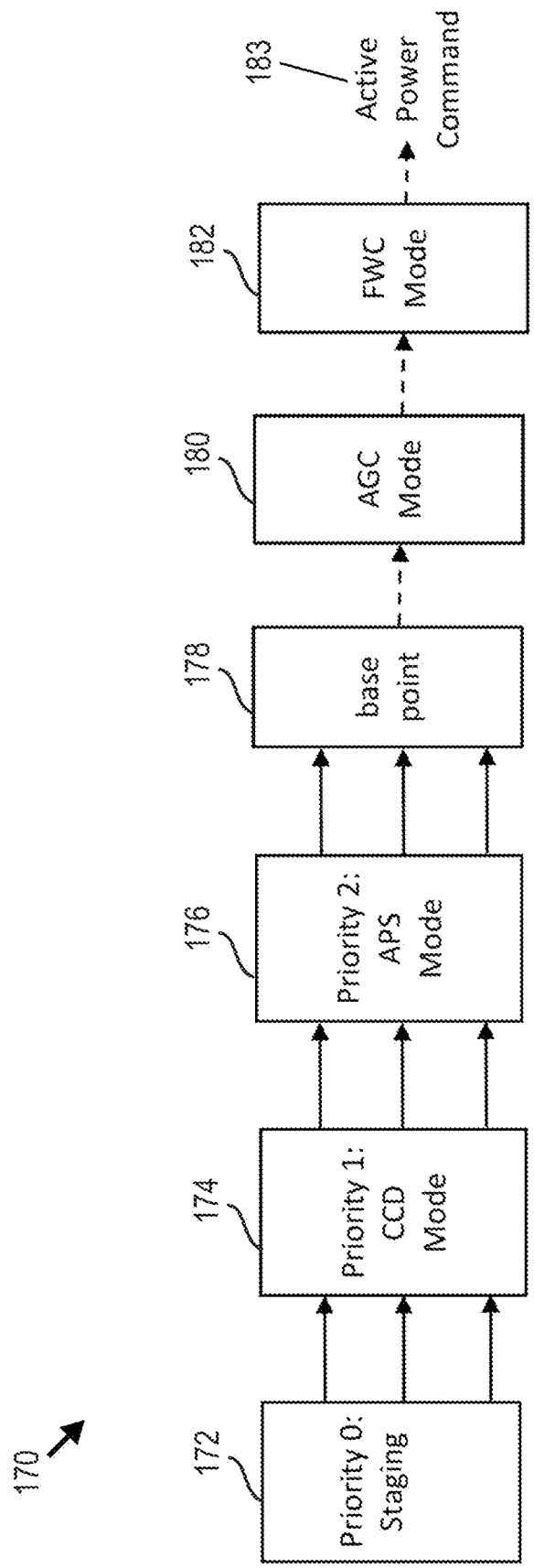
FIG. 9 is a second diagram illustrating a serial (or stacking) arrangement of different control modes including multiple control signal candidate values, including serially connected basepoint and non-basepoint control modes configured to produce a single active power command.

FIG. 9 is a second diagram illustrating a serial (or stacking) arrangement of different control modes 172, 174, 176, 180, 182 usable by a control system 170. The control system 170 utilizes serially connected basepoint control modes 172, 174, 176 and non-basepoint control modes 180, 182 that produce a single active power command. Each control mode 172, 174, 176, 180, 182 includes multiple control signal candidate values. The highest priority, staging mode 172 consists of the operating limits of the BESS, and is followed (in decreasing priority) by CCD mode 172 and APS mode 174, respectively, to yield a basepoint value 178. The basepoint value 178 is generated by identifying an intersection of control signal candidate values among the preceding control modes 172, 174, 176, or selecting an ideal value for the preceding control mode of highest priority. This basepoint value 178 is modified (e.g., increased or decreased) by serial application of the Automatic Generation Control (AGC) mode 180 and Frequency-Watt Curve (FWC) mode 182, respectively. A time-varying charge/discharge control signal (e.g., an active power command signal) 183 results from modification of the basepoint value 178 with non-basepoint values generated by the AGC and FWC modes 180, 182. FIG. 9 therefore illustrates how AGC and FWC modes 180, 182 may add power to the basepoint. A typical implementation of additive modes may assume that some power from the BESS is reserved from the calculation of the basepoint value 178. For example, a 20 MW BESS may have 2 MW reserved for AGC and FWC modes. Therefore the staging mode (priority 0) would only see −18 to 18 MW available. In one implementation, a basepoint value of −18 MW may be calculated, AGC mode may yield 2 MW, and FWC mode may yield −1 MW. An active power command of −17 MW may result (calculated as (−18)+(2)+(−1)). AGC mode is an additive power control mode that outputs a single PV+S power setpoint based on an active power target set by the master, wherein the AGC output is added on top of the basepoint value, subject to operating limit constraints of a RES-ESS (e.g., PV+S) facility.

FWC mode is an additive power control mode used to alter a system's power output in response to measured deviation from a specified nominal frequency. In certain embodiments, FWC may involve measuring grid frequency using the reference EPC meter. If the grid frequency is within a specified deadband or if the current BESS SOC is outside allowed usable SOC limits, then no action is performed. However, if the grid frequency is outside a specified deadband, then additional power to be provided is calculated using a measured droop.

In certain embodiments, ramp rate constraints may be applied to a control signal for a RES-ESS facility, wherein forecasted RES produced may be examined at every timestep, and power may be curtailed preemptively in order to mitigate RES production ramp down events (e.g., sudden dips in PV production). Ramp rate in this context may be defined as the change in power output of a RES facility or RES-ESS facility (e.g., PV+S facility) in a given time interval (e.g., change per minute or change per hour). Leveraging of short-term RES production forecasts may be used. The two main ramping events subject to control are (1) ramp down events, and (2) ramp up events. Ramp-down events in the context of a facility including PV production may be mitigated by obtaining a forecast for future PV from the current time to 'f' minutes in the future, wherein 'f' is a function of a ramp rate down limit. A gradient or slope between the current plant production and the forecasted PV power values may be calculated and compared with a defined ramp rate down limit. If the gradients of future power values are not within the ramp rate down limit, then PV power may be curtailed by an amount equal to the minimum gradient in the current forecast time series. If the gradients of future power values are within the ramp rate down limit, then no corrective action is necessary.

Controlling ramp rate up events is simpler. At every timestep, current RES (e.g., PV) production is compared with the plant production in the previous timestep. If the plant production is less than the current RES production, then curtailment is applied to make sure that the RES plant output does not violate the ramp limit. This function may be performed by inverters at the RES-ESS plant. This may be applied in two instances. Firstly, if there is a sudden increase in RES production, this logic will control plant production so that total output increases in steps of power that are less than equal to the ramp rate up limit. Secondly, if energy had been curtailed in the previous timestep to sustain a ramp rate down event, the RES-ESS plant output is increased by no greater than the ramp rate up limit in order to bring the curtailment back to zero. After ramp rate up curtailment power has been calculated, gradients to forecasted RES production values are recalculated for the ramp-up curtailment. If the result of the current ramp rate up event causes uncontrollable violations in the future, then an optimal curtailment solution is obtained so that all future violations are controlled.

Figure 10:
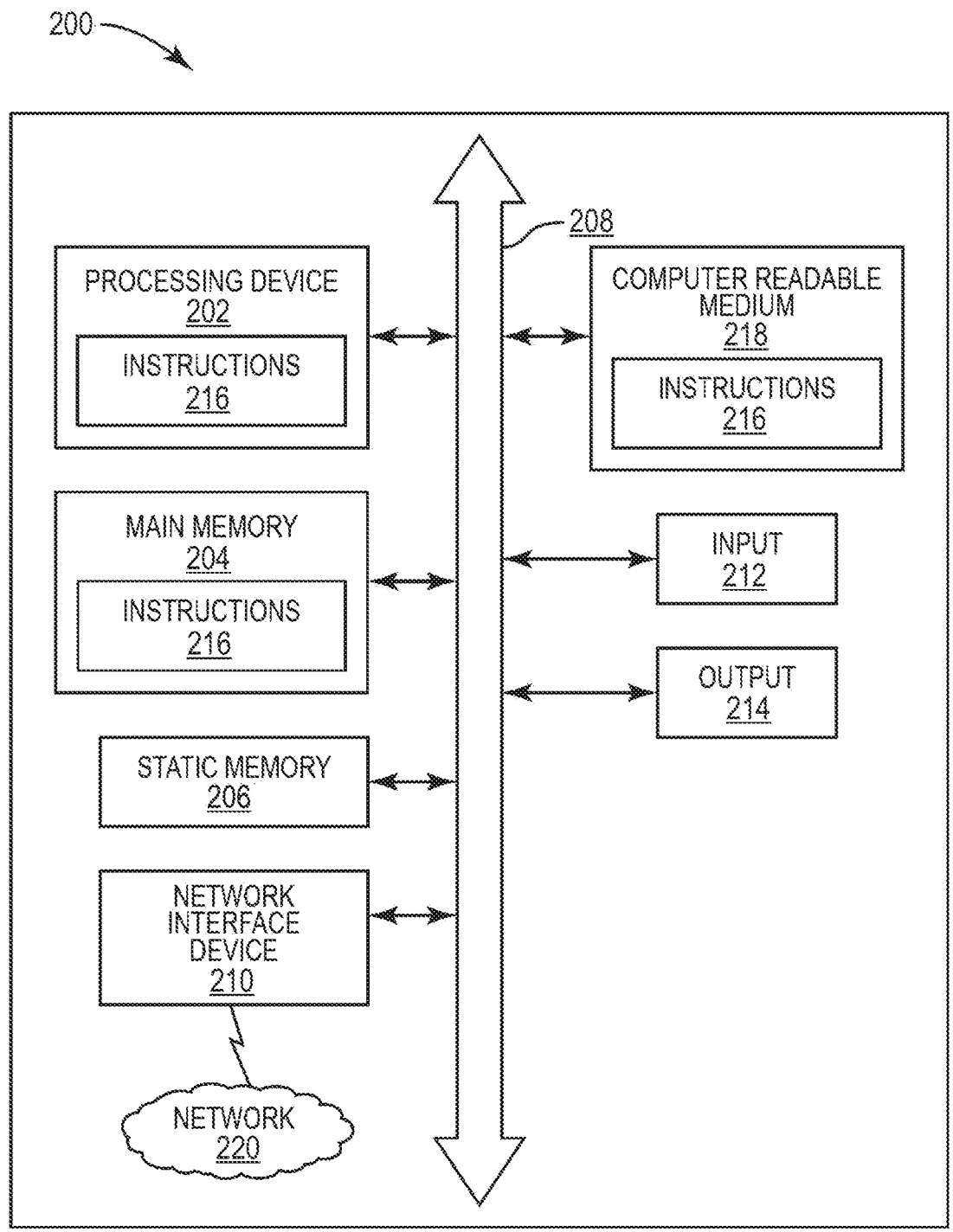
FIG. 10 is schematic diagram of a generalized representation of a computer system that can be included as one or more components of a system for controlling a renewable electrical energy generation resource and an electrical energy storage device chargeable with electric power produced by the renewable electrical energy generation resource, according to one embodiment.

FIG. 10 is schematic diagram of a generalized representation of a computer system 200 that can be included as one or more components of a system for controlling a renewable electrical energy generation resource and an electrical energy storage device chargeable with electric power produced by the renewable electrical energy generation resource, according to one embodiment. The computer system 200 may be adapted to execute instructions from a computer-readable medium to perform these and/or any of the functions or processing described herein.

The computer system 200 may include a set of instructions that may be executed to program and configure programmable digital signal processing circuits for supporting scaling of supported communications services. The computer system 200 may be connected (e.g., networked) to other machines in a local area network (LAN), an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 200 may be a circuit or circuits included in an electronic board or card, such as a printed circuit board (PCB), a server, a personal computer, a desktop computer, a laptop computer, a personal digital assistant (PDA), a computing pad, a mobile device, or any other device, and may represent, for example, a server or a user's computer.

The computer system 200 in this embodiment includes a processing device or processor 202, a main memory 204 (e.g., read-only memory (ROM), flash memory, dynamic random access memory (DRAM), such as synchronous DRAM (SDRAM), etc.), and a static memory 206 (e.g., flash memory, static random access memory (SRAM), etc.), which may communicate with each other via a data bus 208. Alternatively, the processing device 202 may be connected to the main memory 204 and/or static memory 206 directly or via some other connectivity means. The processing device 202 may be a controller, and the main memory 204 or static memory 206 may be any type of memory.

The processing device 202 represents one or more general-purpose processing devices, such as a microprocessor, central processing unit (CPU), or the like. In certain embodiments, the processing device 202 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 202 is configured to execute processing logic in instructions for performing the operations and steps discussed herein.

The computer system 200 may further include a network interface device 210. The computer system 200 may additionally include at least one input 212, configured to receive input and selections to be communicated to the computer system 200 when executing instructions. The computer system 200 also may include an output 214, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 200 may or may not include a data storage device that includes instructions 216 stored in a computer readable medium 218. The instructions 216 may also reside, completely or at least partially, within the main memory 204 and/or within the processing device 202 during execution thereof by the computer system 200, the main memory 204 and the processing device 202 also constituting computer readable medium. The instructions 216 may further be transmitted or received over a network 220 via the network interface device 210.

While the computer readable medium 218 is shown in an embodiment to be a single medium, the term "computer-readable medium" should be taken to include a single medium or multiple media (e.g., a centralized or distributed database, and/or associated caches and servers) that store the one or more sets of instructions. The term "computer readable medium" shall also be taken to include any medium that is capable of storing, encoding, or carrying a set of instructions for execution by the processing device and that cause the processing device to perform any one or more of the methodologies of the embodiments disclosed herein. The term "computer readable medium" shall accordingly be taken to include, but not be limited to, solid-state memories, an optical medium, and/or a magnetic medium.

In certain embodiments, systems and apparatuses disclosed herein may utilize a non-transitory computer readable medium containing program instructions for controlling, by at least one processor, (i) a renewable electrical energy generation resource and (ii) an electrical energy storage device chargeable with electric power produced by the renewable electrical energy generation resource, the method comprising utilizing, by the at least one processor, (A) a time-dependent forecast of electrical energy production by the renewable electrical energy generation resource and (B) a state of charge (SOC) schedule for the electrical energy storage device including at least one SOC target value, to generate a time-varying charge/discharge control signal for the electrical energy storage device, wherein the time-varying charge/discharge control signal is configured to ensure that the SOC schedule is satisfied by charging at the average rate necessary to meet the SOC target schedule, while periodically updating the generation of the time-varying charge/discharge control signal based upon at least one of an updated time-dependent forecast of electrical energy production or an updated SOC schedule. In certain embodiments, the program instructions contained in the computer readable medium may be configured to perform additional method steps as disclosed herein.

Figure 11A:
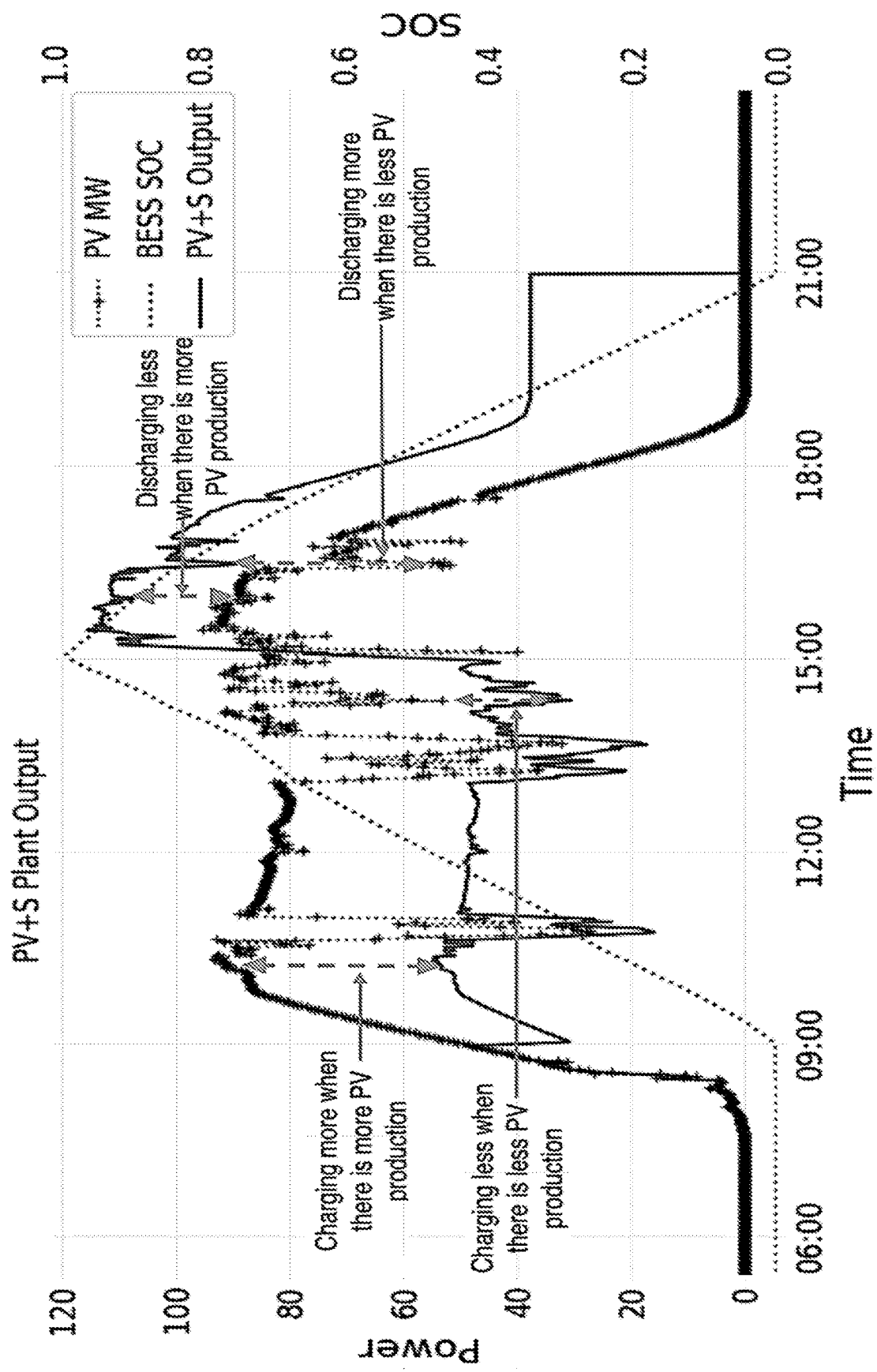
FIG. 11A is a modeled output plot for a system including a renewable electrical energy generation resource (RES) and an electrical energy storage device (ESS) chargeable with electric power produced by the RES, when controlled by a method as disclosed herein but without a configurable refresh period, for a period including 06:00 to 21:00 of a single day.
Figure 11B:
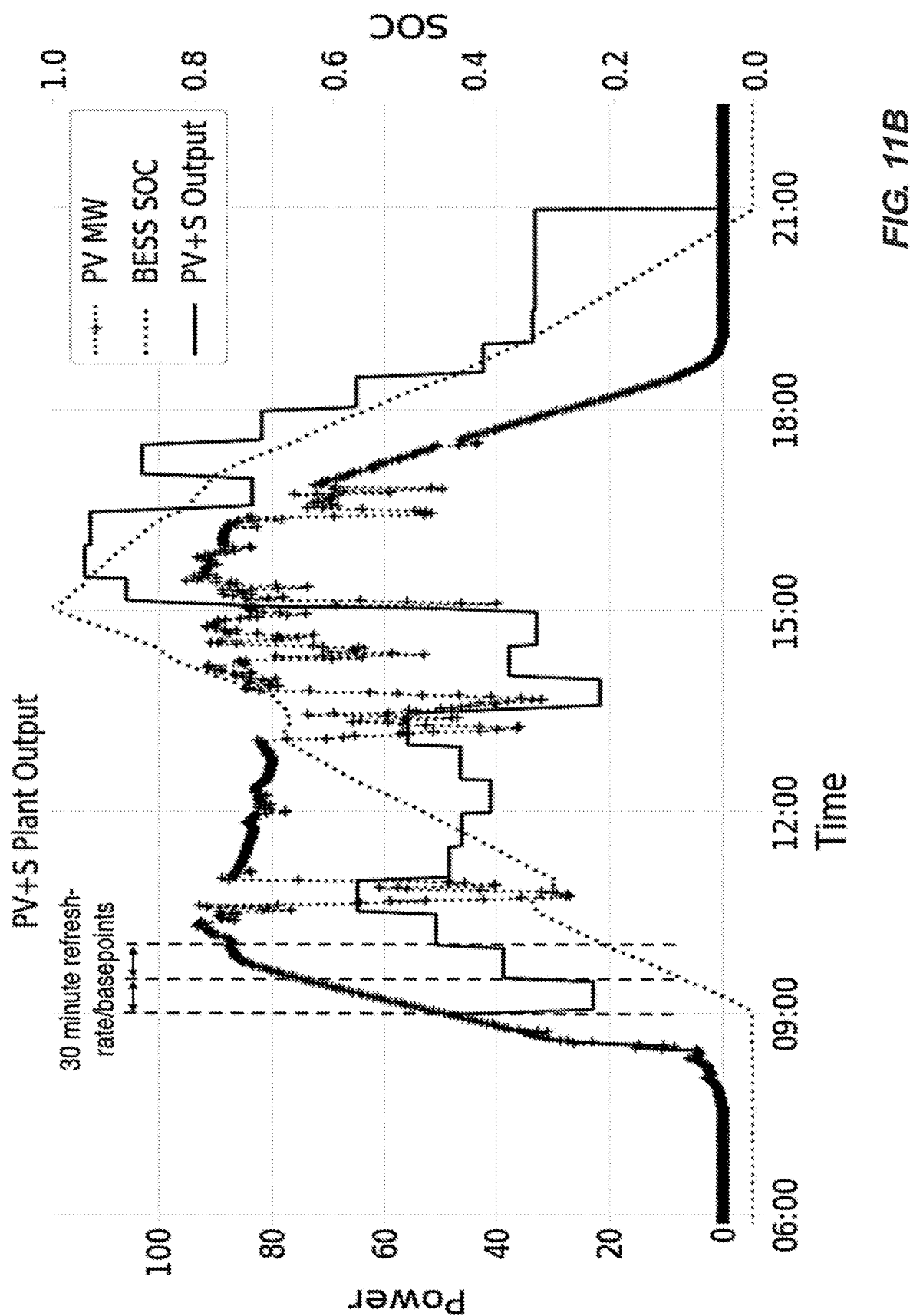
FIG. 11B is a modeled output plot for the same RES-ESS system and period depicted in FIG. 11A, when controlled by a method disclosed herein with utilization of a 30 minute refresh period, in which basepoint value is recalculated once every 30 minutes.

FIGS. 11A and 11B are provided to permit visual comparison of the effects of not utilizing versus utilizing a refresh period to limit recalculation of basepoint values for controlling aggregate output of a RES-ESS facility. FIG. 11A is a modeled output plot for a system including a renewable electrical energy generation resource (RES) in the form of PV and an electrical energy storage device (ESS) chargeable with electric power produced by the renewable electrical energy generation resource, when controlled by a method as disclosed herein but without a configurable refresh period, for a period including 06:00 to 21:00 of a single day. Significant temporal fluctuation in aggregated photovoltaic plus storage (PV+S) output is shown between 09:00 and 18:00, with very few time periods having a non zero slope that would correspond to constant power output. These fluctuations in plant output would inhibit the ability of a plant operator to participate by bidding to supply fixed blocks of power for specified periods of time in energy markets and/or energy balance markets.

FIG. 11B is a modeled output plot for the same RES-ESS system and period depicted in FIG. 11A, when controlled by a method disclosed herein with utilization of a 30 minute refresh period, in which basepoint value is recalculated once every 30 minutes. As shown, the aggregated PV+S output remains substantially constant for each 30 minute time period, since the basepoint control value remains constant during each 30 minute refresh period. The application of a refresh period for coordinate control of a RES-ESS facility enables the plant to supply fixed blocks of power for specified time periods, thereby permitting the plant operator to participate by bidding to supply fixed blocks of power for specified periods of time in energy markets and/or energy balance markets.

Figure 12A:
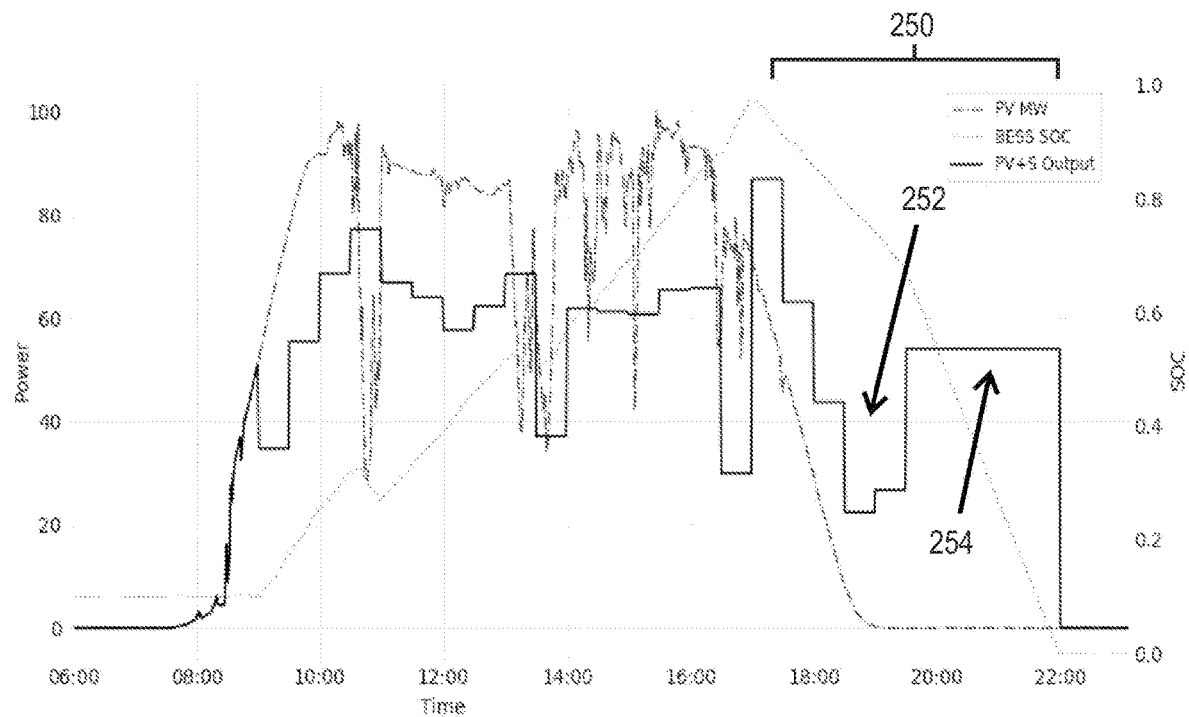
FIGS. 12A and 12B provided modeled output plots for a system including a renewable electrical energy generation resource (RES) and an electrical energy storage device (ESS) chargeable with electric power produced by the RES, each utilizing a refresh period, but with FIG. 12B using a static window that takes into account the solar production forecast from the beginning of the control period until the end in order to meet a SOC target schedule.
Figure 12B:
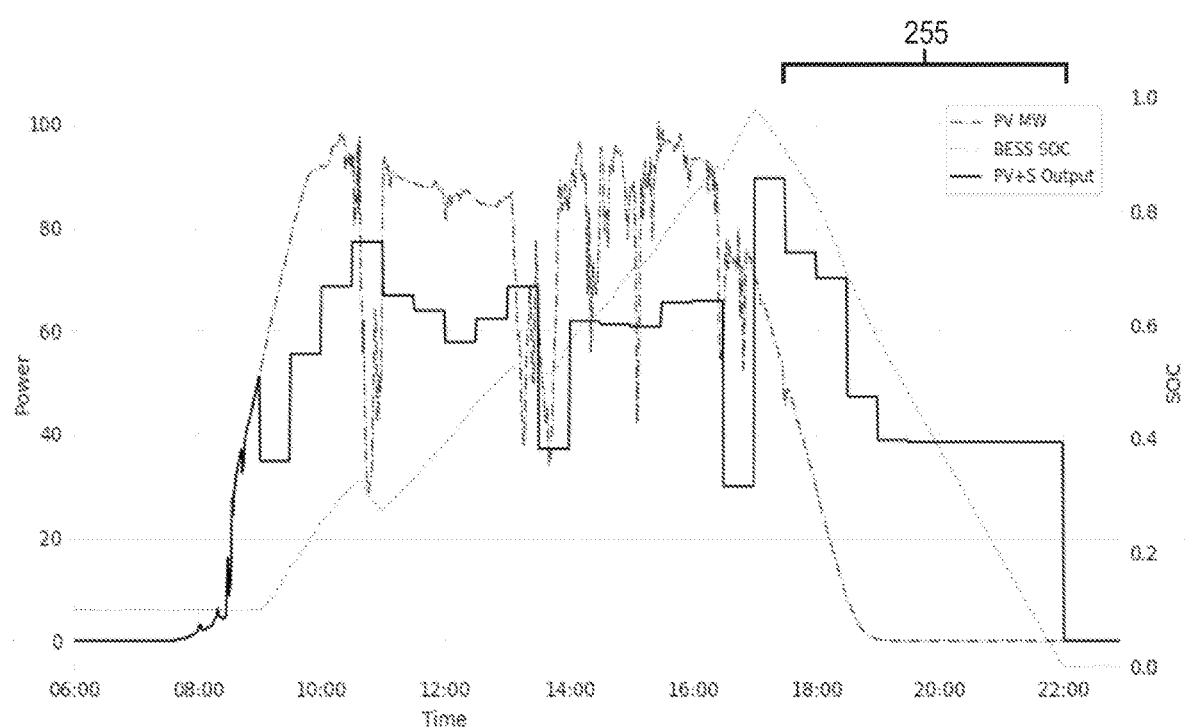

FIGS. 12A and 12B provided modeled output plots for a system including a renewable electrical energy generation resource (RES) (e.g., PV) and an electrical energy storage device (ESS) chargeable with electric power produced by the RES. The output plots of FIGS. 12A and 12B exhibit utilization of a refresh period, but only the output plot of FIG. 12B avoids an undesirable valley in aggregated plant (PV+S) output after daily PV production has ended, followed by an increase in PV+S output during discharge of the ESS. The output plot of FIG. 12A corresponds to a control scheme that utilizes a SOC compliance evaluation period that considers only hours remaining the day for each time period—namely, from the current time to an end of day SOC target (e.g., 22:00 hours in each figure). The limitation of this approach is that it may not discharge an ESS rapidly enough when RES (e.g., PV) production drops and stays low through the end of a day. Additionally, the approach in FIG. 12A leads to a diminishing average power problem. When the window is updated to be smaller and smaller as the current time increments and the end of the window remains constant, during a natural ramp down the average tends to always be lower than the current power. This results in the algorithm estimating a lower basepoint and causes the valley 252 that is apparent in FIG. 12A. Although a zero SOC target is attained at 22:00 in each of FIGS. 12A and 12B, and each figure is substantially identical from the start of day until about 17:00, the output plots of FIGS. 12A and 12B differ significantly between 17:00 and 22:00. FIG. 12A provides a PV+S profile 250 between 17:00 and 22:00 that includes a valley region 251 in which PV+S output declines to a minimum of about 22 MW followed by a PV+S increase region 254 in which PV+S output is increased to a value of nearly 50 MW before declining rapidly to zero at 22:00. In contrast, FIG. 12B provides a different PV+S profile 255 that is devoid of any valleys followed by positive slope regions that would correspond to increases in PV+S output. In particular, the PV+S profile 255 shown in FIG. 12B decreases in a substantially stepwise manner between 17:00 and 22:00, with a final drop from about 30 MW to zero at 22:00. This improved PV+S profile 255 shown in FIG. 12B may be attained by utilization of a static window instead of a dynamic window for meeting an end of day SOC target. Furthermore, while the window length is static, the forecasted power values in the window are updated as the facility receives updated forecasts. While specific aspects, features and illustrative embodiments have been disclosed herein, it will be appreciated that the disclosure extends to and encompasses numerous other variations, modifications, and alternative embodiments, as will suggest themselves to those of ordinary skill in the pertinent art, based on the disclosure herein. Various combinations and sub-combinations of the structures described herein are contemplated and will be apparent to a skilled person having knowledge of this disclosure. Any of the various features and elements as disclosed herein may be combined with one or more other disclosed features and elements unless indicated to the

What is claimed is:

1. A method comprising:
obtaining a state of charge (SOC) schedule for an energy storage device and a time-dependent forecast of electrical energy production by a renewable electrical energy generation resource, wherein the SOC schedule defines an SOC target for each of a plurality of time periods;
generating a time-varying charge/discharge control signal for the electrical energy storage device based on the time-dependent forecast of electrical energy production, wherein the time-varying charge/discharge control signal is configured to maintain an average SOC of the energy storage device as low as possible while satisfying the SOC target for each of the plurality of time periods of the SOC schedule; and
controlling charging and discharging of the energy storage device with the time-varying charge/discharge control signal.

2. The method of claim 1, wherein the time varying charge/discharge control signal is configured to maintain the average SOC of the energy storage device while charging only from the renewable electrical energy generation resource.

3. The method of claim 1, further comprising periodically updating the generation of the time-varying control signal upon expiration of a refresh period, wherein the periodic updating comprises computing and using a new basepoint value for aggregated energy supplied from the renewable electrical energy generation resource and the electrical energy storage device to an electrical grid upon expiration of the refresh period.

4. The method of claim 1, further comprising altering the time-varying charge/discharge control signal responsive to a difference between forecasted production and actual production of at least one electric generation facility to ensure that the SOC schedule is satisfied.

5. The method of claim 1, wherein the time-varying charge/discharge control signal is further configured to increase a value of the time-varying charge/discharge control signal during periods of increased relative production of the renewable electrical energy generation resource to smooth an aggregated power output supplied to an electrical grid by the renewable electrical energy generation resource and the electrical energy storage device, while ensuring that the SOC schedule is satisfied.

6. The method of claim 1, wherein the time-varying charge/discharge control signal is susceptible to being varied by adoption of one or more control modes of a plurality of control modes, and wherein the method further comprises:
for each control mode of the plurality of control modes, generating a plurality of control signal candidate values including an upper bound value, a lower bound value, and an ideal value; and
identifying an intersection of control signal candidate values among multiple control modes, or selecting an ideal value for a control mode of highest priority, to generate the time-varying charge/discharge control signal.

7. The method of claim 6, wherein the plurality of control modes comprises two or more of the following modes: Charge-Discharge mode, Coordinate Charge Discharge mode, Active Power Limit mode, Active Power Response mode, Active Power Smoothing mode, and Pricing Signal mode.

8. The method of claim 7, wherein the plurality of control modes further comprises at least one of the following modes: Volt-Watt mode, Frequency-Watt Curve mode, and Automatic Generation Control mode.

9. The method of claim 1, wherein the renewable electrical energy generation resource comprises a photovoltaic array, the electrical energy storage device comprises a battery array, and the time-dependent forecast of electrical energy production comprises a solar production forecast.

10. The method of claim 1, wherein the renewable electrical energy generation resource comprises at least one wind turbine, the electrical energy storage device comprises a battery array, and the time-dependent forecast of electrical energy production comprises a wind production forecast.

11. The method of claim 1, wherein the time-dependent forecast of electrical energy production comprises an ensemble based on of two or more of the following: on-site sky imaging, satellite imaging, and meteorological modeling.

12. A non-transitory computer readable medium comprising instructions stored thereon that, when executed by a processor, cause the processor to perform operations comprising:
obtaining a state of charge (SOC) schedule for an energy storage device and a time-dependent forecast of electrical energy production by a renewable electrical energy generation resource, wherein the SOC schedule defines an SOC target for each of a plurality of time periods;
generating a time-varying charge/discharge control signal for the electrical energy storage device based on the time-dependent forecast of electrical energy production, wherein the time-varying charge/discharge control signal is configured to maintain an average SOC of the energy storage device as low as possible while satisfying the SOC target for each of the plurality of time periods of the SOC schedule; and
controlling charging and discharging of the energy storage device with the time-varying charge/discharge control signal.

13. The method of claim 12, wherein the time varying charge/discharge control signal is configured to maintain the average SOC of the energy storage device while charging only from the renewable electrical energy generation resource.

14. The non-transitory computer readable medium of claim 12, wherein the time-varying charge/discharge control signal is further configured to increase a value of the time-varying charge/discharge control signal during periods of increased relative production of the renewable electrical energy generation resource to smooth an aggregated power output supplied to an electrical grid by the renewable electrical energy generation resource and the electrical energy storage device, while ensuring that the SOC schedule is satisfied.

15. The non-transitory computer readable medium of claim 12, wherein the time-varying charge/discharge control signal is susceptible to being varied by adoption of one or more control modes of a plurality of control modes, and wherein the operations further comprise:
for each control mode of the plurality of control modes, generating a plurality of control signal candidate values including an upper bound value, a lower bound value, and an ideal value; and identifying an intersection of control signal candidate values among multiple control modes, or selecting an ideal value for a control mode of highest priority, to generate the time-varying charge/discharge control signal.

16. The non-transitory computer readable medium of claim 15, wherein the plurality of control modes comprises two or more of the following modes: Charge-Discharge mode, Coordinate Charge Discharge mode, Active Power Limit mode, Active Power Response mode, Active Power Smoothing mode, and Pricing Signal mode.

17. The non-transitory computer readable medium of claim 15, wherein the plurality of control modes further comprises at least one of the following modes: Volt-Watt mode, Frequency-Watt Curve mode, and Automatic Generation Control mode.

18. The non-transitory computer readable medium of claim 12, wherein the renewable electrical energy generation resource comprises a photovoltaic array, the electrical energy storage device comprises a battery array, and the time-dependent forecast of electrical energy production comprises a solar production forecast.

19. A system comprising:
a processor coupled with memory, the processor configured to:
obtain a state of charge (SOC) schedule for an energy storage device and a time-dependent forecast of electrical energy production by a renewable electrical energy generation resource, wherein the SOC schedule defines an SOC target for each of a plurality of time periods;
generate a time-varying charge/discharge control signal for the electrical energy storage device based on the time-dependent forecast of electrical energy production, wherein the time-varying charge/discharge control signal is configured to maintain an average SOC of the energy storage device as low as possible while satisfying the SOC target for each of the plurality of time periods of the SOC schedule; and
control charging and discharging of the energy storage device with the time-varying charge/discharge control signal.

20. The system of claim 19, wherein the time varying charge/discharge control signal is configured to maintain the average SOC of the energy storage device while charging only from the renewable electrical energy generation resource energy source.

* * * * *